US010476679B2

(12) United States Patent
Fynaardt et al.

(10) Patent No.: US 10,476,679 B2
(45) Date of Patent: Nov. 12, 2019

(54) SYSTEMS, METHODS, AND DEVICES FOR MULTI-STAGE PROVISIONING AND MULTI-TENANT OPERATION FOR A SECURITY CREDENTIAL MANAGEMENT SYSTEM

(71) Applicant: INTEGRITY Security Services, Inc., Irvine, CA (US)

(72) Inventors: Daniel R. Fynaardt, Capistrano Beach, CA (US); William L. Lattin, Los Altos, CA (US); Gregory Powell, Ladera Ranch, CA (US)

(73) Assignee: INTEGRITY SECURITY SERVICES, INC., Irvine, CA (US)

( * ) Notice: Subject to any disclaimer, the term of this patent is extended or adjusted under 35 U.S.C. 154(b) by 0 days.

(21) Appl. No.: 16/191,030

(22) Filed: Nov. 14, 2018

(65) Prior Publication Data

US 2019/0149342 A1    May 16, 2019

Related U.S. Application Data

(60) Provisional application No. 62/585,756, filed on Nov. 14, 2017.

(51) Int. Cl.
*H04L 9/32* (2006.01)
*H04L 29/06* (2006.01)
(Continued)

(52) U.S. Cl.
CPC ........ *H04L 9/3268* (2013.01); *H04L 41/0806* (2013.01); *H04L 41/5041* (2013.01);
(Continued)

(58) Field of Classification Search
None
See application file for complete search history.

(56) References Cited

U.S. PATENT DOCUMENTS

| 8,010,786 B1 * | 8/2011 | Ward | H04L 63/20 |
| | | | 713/156 |
| 10,154,061 B1 * | 12/2018 | Schetina | H04L 63/1466 |

(Continued)

*Primary Examiner* — Michael R Vaughan
(74) *Attorney, Agent, or Firm* — MH2 Technology Law Group LLP

(57) ABSTRACT

An example system for securely provisioning computerized devices of a plurality of tenants includes a Security Credential Management System (SCMS) host that is communicatively connected to the devices and is operable to receive provisioning requests from computerized devices needing certificates. Each provisioning request indicates a tenant identifier (ID) uniquely identifying a tenant of the plurality of tenants. The system also includes a virtual registration authority communicatively connected to the SCMS host and operable to transmit requests to SCMS backend components. The backend components include an enrollment certificate authority operable to generate enrollment certificates in response to receiving requests for enrollment certificates from the virtual registration authority; first and second linkage authorities operable to generate linkage values responsive to receiving requests for linkage values from the virtual registration authority; and a pseudonym certificate authority operable to generate pseudonym certificates responsive to receiving requests for pseudonym certificates from the virtual registration authority.

25 Claims, 10 Drawing Sheets

(51) Int. Cl.
  *H04L 12/24* (2006.01)
  *H04L 29/08* (2006.01)
  *G06F 16/22* (2019.01)

(52) U.S. Cl.
  CPC .............. *H04L 63/00* (2013.01); *H04L 63/20* (2013.01); *G06F 16/22* (2019.01); *H04L 63/166* (2013.01); *H04L 67/02* (2013.01); *H04L 67/12* (2013.01); *H04L 67/306* (2013.01); *H04L 2209/80* (2013.01); *H04L 2209/84* (2013.01)

(56) References Cited

U.S. PATENT DOCUMENTS

| | | | |
|---|---|---|---|
| 2012/0089734 A1* | 4/2012 | Mercuri | G06F 9/5055 709/226 |
| 2014/0007178 A1* | 1/2014 | Gillum | G06F 21/00 726/1 |
| 2017/0222990 A1* | 8/2017 | Romansky | H04L 63/06 |
| 2018/0004933 A1* | 1/2018 | Nathanson | H04W 4/44 |
| 2018/0137261 A1* | 5/2018 | Lattin | G06F 21/12 |
| 2018/0159935 A1* | 6/2018 | Cavalcanti | H04W 4/44 |
| 2018/0275966 A1* | 9/2018 | Linton | G06F 16/95 |
| 2018/0316511 A1* | 11/2018 | Meyer | H04L 9/3268 |
| 2019/0089547 A1* | 3/2019 | Simplicio, Jr. | H04L 9/3268 |
| 2019/0098471 A1* | 3/2019 | Rech | G08G 1/162 |
| 2019/0116048 A1* | 4/2019 | Chen | H04L 9/3268 |

\* cited by examiner

SYSTEMS, METHODS, AND DEVICES FOR MULTI-STAGE PROVISIONING AND MULTI-TENANT OPERATION FOR A SECURITY CREDENTIAL MANAGEMENT SYSTEM

CROSS-REFERENCE TO RELATED APPLICATIONS

This application claims the benefit of U.S. Provisional Application No. 62/585,756 filed on 14 Nov. 2017; which is hereby incorporated by reference in its entirety.

FIELD OF THE INVENTION

This invention relates to systems, devices, and methods for securely generating and providing certain types of digital assets such as security credentials and digital certificates. More particularly, the invention relates to improved systems, methods and techniques for providing multi-tenant operations (e.g., multi-client) while securely provisioning digital assets in computerized devices in order to improve efficiency in provisioning the digital assets in the computerized devices that are associated with multiple tenants (e.g., multiple clients).

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of Things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" needs to be uniquely identifiable through its embedded computing system, and be able to inter-operate within the existing Internet infrastructure or by using other communications media.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as Car-to-Car (C2C)) communications and/or from/to infrastructure elements in Vehicle-to-Infrastructure (V2I; also known as Car-to-Infrastructure (C2I)) communications for safe, correct, efficient, and reliable operation.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

Existing techniques for provisioning digital assets in computerized devices associated with multiple tenants (e.g., clients) require a dedicated Security Credential Management System (SCMS) that is specifically configured for each tenant or client. That is, existing techniques for provisioning digital assets in computerized devices do not enable an SCMS to provide multi-tenant operations.

Accordingly, it is desirable to provide improved systems, methods and techniques for providing multi-tenant (e.g., multi-client) operations while securely provisioning digital assets in computerized devices, such as IoT devices, vehicles, and transportation infrastructure devices, in order to reduce or eliminate redundancies in requiring separate Security Credential Management Systems (SCMSs) for provisioning the digital assets in the computerized devices of separate tenants (e.g., clients).

SUMMARY

Disclosed herein are systems, methods and devices for fulfilling requests from multiple tenants (e.g., clients, subscribers, and customers) to generate certain types of digital assets such as security credentials and digital certificates. In certain implementations, a multi-tenant secure provisioning system includes a subscriber portal (e.g., a certificate management system (CMS) management portal (CMP)), a subscriber management system (SMS), and an SCMS with virtual registration authorities (collectively, an "enhanced SCMS"). In various implementations, the enhanced SCMS includes an SCMS host that hosts virtual registration authorities to provide certificates to tenants (e.g., clients, subscribers, customers) requesting certificates from the enhanced SCMS. In some implementations, the enhanced SCMS hosts virtual registration authorities that can be shared amongst subsets of a plurality of tenants and one or more dedicated registration authorities that are exclusively dedicated to respective ones of a plurality of tenants. A virtual registration authority accepts requests from the subscriber portal to create and provide certain types of digital assets such as security credentials and public key certificates for computerized devices associated with a given tenant. In some implementations, the subscriber portal is a certificate management system (CMS) management portal (CMP) that is communicatively coupled with the SMS. The SMS is operable to retrieve subscriber data from an SMS database. In certain implementations, the SMS functions as an entity management system for managing profiles of end entities, which can correspond to tenants.

As additionally described herein, the SCMS host and virtual registration authorities enable the enhanced SCMS to provide multi-tenant operations.

In various implementations, a system securely provisions a plurality of computerized devices of a plurality of tenants. The system includes an SCMS host that is communicatively connected to the plurality of computerized devices and that is operable to receive provisioning requests from respective ones of the plurality of computerized devices needing certificates, each provisioning request indicating a tenant identifier (ID) uniquely identifying a tenant of the plurality of tenants. The system also includes at least one virtual registration authority that is communicatively connected to the SCMS host and is operable to transmit requests to a set of SCMS backend components. The set of SCMS backend components includes: an enrollment certificate authority operable to generate enrollment certificates in response to receiving requests for enrollment certificates from the at least one virtual registration authority; a first linkage authority and a second linkage authority operable to generate linkage values in response to receiving requests for linkage values from the at least one virtual registration authority; and a pseudonym certificate authority operable to generate pseudonym certificates in response to receiving requests for pseudonym certificates from the at least one virtual registration authority.

In some implementations, the system further includes a plurality of virtual registration authorities. The plurality of virtual registration authorities include: at least one shared virtual registration authority that is operable to process requests for two or more tenants of the plurality of tenants; and at least one dedicated virtual registration authority that is operable to process requests for a single tenant, wherein the single tenant has either a business requirement for certain customization or a service level agreement (SLA) indicating that the SCMS host is to provide a higher service tier to the single tenant than a service tier provided to the two or more tenants. In certain implementations, an SLA is not required unless the SLA is a business contract stating that the tenant requires their own dedicated virtual registration authority.

In accordance with some such implementations, the system also includes a plurality of sets of SCMS backend components. The plurality of sets of SCMS backend components include at least one shared set of SCMS backend components. The shared set of SCMS backend components include: a shared enrollment certificate authority operable to generate enrollment certificates for two or more tenants of the plurality of tenants in response to receiving requests for generate enrollment certificates from the at least one shared virtual registration authority; a shared first linkage authority and a shared second linkage authority operable to generate linkage values for two or more tenants of the plurality of tenants in response to receiving requests for linkage values from the at least one shared virtual registration authority; and a shared pseudonym certificate authority operable to generate pseudonym certificates for two or more tenants of the plurality of tenants in response to receiving requests for pseudonym certificates from the at least one shared virtual registration authority.

According to some such implementations, the system also includes at least one isolated and independent set of SCMS backend components. The independent set of SCMS backend components include: an independent enrollment certificate authority operable to generate enrollment certificates for the single tenant in response to receiving requests for generate enrollment certificates from the at least one dedicated virtual registration authority; an independent first linkage authority and an independent second linkage authority operable to generate linkage values for the single tenant in response to receiving requests for linkage values from the at least one dedicated virtual registration authority; and an independent pseudonym certificate authority operable to generate pseudonym certificates for the single tenant in response to receiving requests for pseudonym certificates from the at least one dedicated virtual registration authority.

In accordance with some such implementations, a service tier is associated with each tenant of the plurality of tenants, and the service tier corresponds to one of a plurality of tiers ranging from a lowest service level to a highest service level. According to such implementations, a higher service tier can give a tenant access to a dedicated registration authority that is not shared or used by other tenants. In one such implementation, a dedicated registration authority can be created and configured for a tenant with a higher service tier so that the dedicated registration authority gives that tenant a unique interface. In some such implementations, a tenant with a higher service tier is given access to isolated and independent backend SCMS components that are not shared with other tenants. In additional or alternative implementations, a tenant with a higher service tier and a dedicated registration authority can access different shared SCMS backend components, depending on product type for that tenant's devices that need certificates. That is, an OBU device may use one shared SCMS backend component and an RSU device could use another shared SCMS backend component.

According to some such implementations, the SCMS host is further operable to: parse the tenant ID from each provisioning request; and route, based on the tenant ID and the service tier associated with the tenant, each provisioning request to one of the at least one shared virtual registration authority or at least one dedicated virtual registration authority.

In other implementations, each provisioning request indicates the tenant ID in one of a Uniform Resource Locator (URL), a route, a key value pair, or an HTTP header element.

In yet other implementations, each provisioning request further indicates configuration details for the tenant, application permissions needed by the tenant, and validity information for certificates needed by a computerized device of the tenant. According to some such implementations, the application permissions needed by the tenant are centrally configured and managed by the SCMS host, and the application permissions needed by the tenant are applied to issued certificates based on the tenant ID or a device identifier identifying a computerized device of the tenant. In some such implementations, the application permissions are indicated by Provider Service Identifier (PSID) values in a provisioning request. In yet further implementations, the PSID values may be centrally managed by the SCMS on a per-tenant and/or per-device basis and applied by the SCMS to the certificates it issues to the tenant and that tenant's computerized devices that need certificates.

In still other implementations, each provisioning request is an HTTPS POST command with a URL of the at least one virtual registration authority.

In additional implementations, the system also includes a certificate management system (CMS) management portal (CMP) operable to provide interfaces for the plurality of computerized devices and the plurality of tenants to communicate with the enhanced SCMS.

In other implementations, the system additionally includes a subscriber management system (SMS) operable to store and manage account information of the plurality of tenants. According to some such implementations, the system also includes an SMS database that is operably connected to the SMS and that is operable to store the account information and local policy parameters for the tenant. In some such implementations, the local policy parameters are stored in a local policy file (LPF) for the tenant. In accordance with some such implementations, the LPF for the tenant includes parameters that configure a duration of validity for certificates, a number of certificates computerized devices of the tenant is allowed to possess, an overlap time period for certificates, an amount of time the certificates will be valid for in the future, and an indication of when the tenant will need to request a certificate top-off.

In certain implementations, the respective ones of the plurality of computerized devices needing certificates correspond to one or more of an On Board Unit (OBU), an Electronic Control Unit (ECU), a Road-Side Unit (RSU), and a Traffic Management Center Device (TMCD). In some such implementations, an OBU is operable to be installed in one or more of a vehicle, a watercraft, an aircraft, a spacecraft, a medical device, a robot, a drone, a wireless communication module, a wired communication module, and an Internet of Things (IoT) device; an ECU is operable to be installed in one or more of a vehicle, a boat, an aircraft, a spacecraft, a medical device, a robot, a drone, a wireless communication module, a wired communication module, and an IoT device; an RSU is operable to be installed in one or more of a traffic control device, an electronic tolling system, a roadside content distribution system, a wireless communication module, a digital billboard, and as an electronic sign; and a TMCD is operable to be installed in local, state or federal traffic management centers for use in digitally signing messages for broadcast or display by an RSU.

In some implementations, a computer implemented method securely provisioning a plurality of computerized devices of a plurality of tenants. The computer implemented method includes receiving, by an SCMS host that is communicatively connected to the plurality of computerized devices, a provisioning request from a computerized device of the plurality of computerized devices needing certificates. The provisioning request indicates a tenant ID uniquely identifying a tenant of the plurality of tenants. The method further includes parsing, by the SCMS host, the tenant ID from the provisioning request. The method additionally includes routing, by the SCMS host, based at least in part on the tenant ID, the provisioning request to at least one virtual registration authority that is communicatively connected to the SCMS host and is operable to transmit requests to a set of SCMS backend components. The set of SCMS backend components include: an enrollment certificate authority operable to generate enrollment certificates in response to receiving requests for enrollment certificates from the at least one virtual registration authority; a first linkage authority and a second linkage authority operable to generate linkage values in response to receiving requests for linkage values from the at least one virtual registration authority; and a pseudonym certificate authority operable to generate pseudonym certificates in response to receiving requests for pseudonym certificates from the at least one virtual registration authority.

In certain implementations, the provisioning request indicates: the tenant ID in one of a Uniform Resource Locator (URL), a route, a key value pair, or an HTTP header element; and configuration details for the tenant, application permissions needed by the tenant, and validity information for certificates needed by a computerized device of the tenant. According to some such implementations, the application permissions are indicated by Provider Service Identifier (PSID) values in the provisioning request. In some such implementations, the PSID values are managed centrally by the SCMS host and inserted into certificates generated in response to the provisioning request.

In accordance with some implementations, the computer implemented method further includes receiving, by the SCMS host, additional information including installation verification test data indicating proper installation of an OBU in a vehicle or an approved computerized device (e.g., a device approved by the U.S. Department of Transportation (USDOT) or other approval body), where the SCMS host requires additional information prior to generating certificates in response to the provisioning request.

BRIEF DESCRIPTION OF THE DRAWINGS

The accompanying drawings, which are incorporated in and constitute a part of this specification, illustrate implementations of the invention and together with the description, serve to explain the principles of the invention. In the figures.

DETAILED DESCRIPTION

Figure 1:
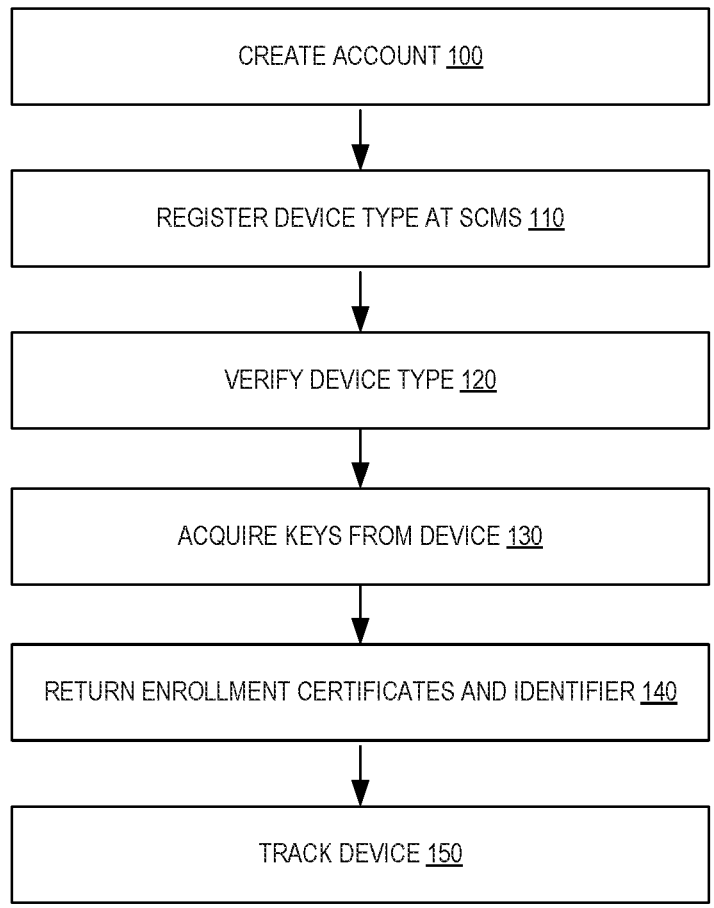
FIG. 1 is a diagram depicting an example of a method for provisioning and tracking computerized devices of entities needing certificates performed in a secure provisioning system, consistent with implementations of the invention.

Reference will now be made in detail to exemplary implementations of the invention, examples of which are illustrated in the accompanying drawings. Wherever convenient, the same reference numbers will be used throughout the drawings to refer to the same or like parts.

In various implementations, embedded computer-controlled devices can be secured by provisioning security assets within the devices. The security assets can include, for example, cryptographic keys, unique identifiers, digital certificates, and security software. Additionally, the security assets can be used for secure communications to, for example, authenticate devices and perform over-the-air programming (OTA) software updates.

In order to ensure safe and proper operation in the field, embedded devices, for instance, the Electronic Control Units (ECUs) used in vehicles, need to be properly initialized during manufacturing by provisioning digital assets, such as security assets. Digital assets could include various digital certificates, cryptographic keys, a unique identifier, and software. In most cases, an SCMS that generates these digital assets for various tenants and manufacturing factories are located in different geographical locations, which are conventionally interconnected via insecure Internet communications. It is therefore desirable to create an end-to-end secure channel from the origin of these digital assets to the devices of multiple tenants, such that the digital assets cannot be accessed or modified by malicious parties or by accident. Typically, different manufacturing factories and tenants (e.g., clients, customers, and subscribers) require different SCMS configurations. In various implementations, a tenant can be an entity such as a company or manufacturer, a client of an SCMS, or a subscriber to a SCMS. Traditionally, a separate SCMS with dedicated hardware must be configured for each tenant. Therefore, it is desirable to minimize redundancy and costs associated with using dedicated, custom-configured SCMSs to provide these digital assets to multiple tenants.

In the following description, reference will be made to security assets provisioned within Vehicle-to-Vehicle and Vehicle-to-Infrastructure (V2X) devices. V2X devices can include, for example, On Board Unit (OBUs), Electronic Control Unit (ECUs), and Road-Side Units (RSUs). However, implementations described herein are not limited to V2X devices, and the disclosed principles can be applied to other types of computer-controlled devices. For example, in additional or alternative implementations, multi-tenant processes and systems can be used to provide certificates to other computerized devices, such as, for example, C2X devices. For instance, an enhanced SCMS with the CMP, virtual registration authorities, SMS, and SMS database components similar to those shown in FIG. 4 can provide certificates to one or more OBUs, ECUs, and RSUs. In various implementations, the OBUs and ECUs can be configured to be installed into vehicles, watercraft (e.g., boats), aircraft (e.g., airplanes and drones), spacecraft, medical devices, robots, wireless or wired communication modules, and IoT devices. Similarly, the RSUs can be installed into traffic control devices (e.g., traffic signals), roadside content distribution systems, electronic tolling systems, electronic signage devices, and digital display devices (e.g., electronic billboards).

In the V2X ecosystem, a security asset (e.g., an enrollment certificate) can be used to identify and authorize an end entity (e.g., a V2X device) to request and receive other security assets (e.g., pseudonym and/or application certificates) from a Security Credential Management System (SCMS). Unlike traditional X.509 certificates, the V2X enrollment certificates and pseudonym certificates do not carry the identity of their corresponding end entity within them; thus, an external observer cannot link their use with a particular vehicle or device. Additionally, the security assets used in the V2X devices are periodically changed during the devices' operational lives.

During manufacturing of V2X devices, the security asset provisioning process may occur at different locations (and therefore at different times), and the locations may or may not belong to different companies (e.g., third party contract manufacturers, different tenants, customers, or subscribers of an SCMS). For example, an initial security asset provisioning process may occur to facilitate manufacturing requirements, to comply with government regulation, etc. For instance, a Tier-1 manufacturer of a V2X device may provision its OBUs with enrollment certificates, and, after the units are installed in vehicles at an original equipment manufacturer (OEM), the pseudonym certificates and other data may then be provisioned to create fully operational OBUs.

The fact that the security asset provisioning process may occur at different locations can create challenges that previous systems did not have the technical capacity to address.

For example, in order to provision security assets at different locations, some systems could allow the security assets to be communicated between locations. However, this can cause time delays during manufacturing because certificates would need to be first requested and then communicated before they can be installed.

Additionally, unlike traditional X.509 certificates, V2X enrollment certificates and pseudonym certificates do not carry the identity of their corresponding end entity within them; therefore, there are additional challenges in matching the correct security assets to the correct V2X devices, particularly, when the security assets are provisioned at different locations.

Further, with traditional SCMSs, each SCMS is configured to deliver specific OBU/RSU information (e.g., configuration information) along with the correct security assets to the V2X devices. Accordingly, a traditional SCMS can only be used by one specific entity (e.g., tenant or client of the SCMS) if that entity wants to provide custom information. Thus, every entity that provides custom information would require its own customized SCMS, which can be costly and does not scale well.

As described herein, a multi-stage provisioning and multi-tenant secure provisioning system that includes a CMP, an SMS, and a SCMS with virtual registration authorities (collectively, an "enhanced SCMS") can address the technical problems described above.

An enhanced SCMS can be used by multiple entities (e.g., multiple tenants, clients, customers and subscribers), can provide unique configuration capabilities to each entity, and can provide entity-unique updates to deployed computerized devices (e.g., V2X or C2X devices). Example entities can be Tier-1 manufacturers (entities that manufacture V2X or C2X devices), OEMs (entities that provide devices to consumers and/or combine multiple V2X or C2X devices into a larger product (e.g., a vehicle)), and traffic management centers (entities that manage RSUs). In various implementations, an entity can also be a combination of a Tier-1 manufacturer, an OEM, and/or a traffic management center.

According to various implementations, an enhanced SCMS has the ability to provide multi-tenant operations by, at enrollment time, linking a computerized device to a specific tenant (e.g., client, customer, subscriber) or deployment.

As described herein, an enhanced SCMS can provide multi-stage provisioning of security assets by providing enrollment certificates to V2X devices during a first stage of the provisioning via a CMP, and then performing additional stages of the provisioning after identification of the devices via the CMP.

In various implementations, the enhanced SCMS can store information for identifying devices at later stages in an SMS database, and can further associate each device with the end entity that provisions the device, as described in further detail below with reference to FIGS. 4-6. Additionally, after enrollment certificates are provisioned on a device, the device can be associated with a status indicating that it is initially provisioned.

For example, enrollment certificates can be provisioned on a device at the manufacturing stage of the device (e.g., by the Tier-1 manufacturer). At this stage, the enhanced SCMS can request a device identifier (e.g., a numeric or alphanumeric code, a serial number of the device's microprocessor, etc.), and may not provision the enrollment certificates until a device identifier is received. When the device identifier is received, the enhanced SCMS can store the device identifier that was received and associate the device identifier with the enrollment certificates that were provisioned for the device and/or with the end entity that provisioned the device.

In certain implementations, aftermarket devices can be included in the SMS database even if enrollment certificates are already provisioned on the device. As described herein, aftermarket devices can be devices that are not manufactured by a Tier-1 manufacturer and/or are manufactured by an entity that does not use the enhanced SCMS. When an aftermarket device is added to the SMS database, the aftermarket device can be associated with a status indicating that it is ready to be provisioned by the enhanced SCMS.

In some implementations, the enhanced SCMS may be able to identify a type of device and/or capabilities of the device. For example, the type of device can be determined by a device identifier and/or via communications with the end entity provisioning the security assets on the device. In various implementations, the type of device can be used to, for example, determine compatible security assets to provision, determine the number of security assets to provision, etc.

For instance, some devices may have more physical security than other devices. Devices with more physical security may be less likely to be stolen or otherwise compromised. Thus, a larger number of certificates may be provisioned on a device that is more physically secure because it is less likely that the security assets will be disclosed if the device becomes compromised. Also, a smaller number of certificates may be beneficial for less physical secure devices because when the device exhausts the provisioned security assets it can contact the enhanced SCMS to "top-off" (i.e., obtain more) security assets. If fewer security assets are provisioned then the device will top-off more often. Thus, if a device is compromised, it can be shut down, located, or otherwise attended to when it contacts the enhanced SCMS to "top-off." Accordingly, the more often the device tops-off, the more chances there are to attend to devices that are more likely to be compromised.

In some implementations, a second stage of provisioning for a V2X device can occur when pseudonym and/or application certificates are provisioned on the V2X device at the OEM (e.g., after being combined with other devices in a vehicle). At this stage, a device identifier can be received from the V2X device, and an enhanced SCMS can use the device identifier to identify the V2X device and then provision the pseudonym and application certificates based on the device that is identified (e.g., based on the enrollment certificates that were previously provisioned, based on a level of physical security for the device, etc.). In some implementations, in addition to the device identifier, an enhanced SCMS can also retrieve other data from a third party, such as test data indicating that the device was properly installed. Based on the device identifier and confirmation of correct installation, the enhanced SCMS can then provision the pseudonym and/or application certificates.

As additionally described herein, an enhanced SCMS can provide multi-tenant operations by providing an SMS (alternatively, an entity management system) for tenants (e.g., end entities) and by managing local policy files (LPFs) containing information unique to each end entity within a V2X ecosystem. For example, customized workflows can be created and customized configurations can be managed by the end entities via the subscriber management system (SMS, also referred to herein as an entity management system). The SMS is operable to manage tenants and information related to the tenants, some of which may be sent to the tenant's OBUs, RSUs, and TMC devices.

In certain implementations, configuration information for each tenant of a plurality of tenants can be stored as elements or data fields in an LPF for that tenant. That is, an LPF stores tenant-specific data. For example, an LPF stores information related to types or classes of computerized devices associated with a tenant, but does not store information for specific end-entities or specific computerized devices that need certificates. For instance, the elements can include information such as, but not limited to, an initial provisioning amount (e.g., an amount of certificates to initially provision to the tenant's devices), cryptographic keys and certificates, linkage authorities (i.e., information identifying linkage authorities to be used by the tenant), and an indication of dedicated hardware to be used to provide a backend Quality of Service (QoS) level to the tenant. In various implementations, an initial provisioning amount indicated in an LPF for a tenant can be indicated in terms of numbers of certain types of certificates (e.g., 10,000 pseudonym certificates) or in terms of duration (e.g., a 6 month supply of certificates).

According to some implementations, an LPF for a given tenant stores one or more of a duration of validity for certificates (e.g., a certificate validity period), a number of certificates the entity is allowed to possess, an overlap time period for certificates, an amount of time certificates will be valid for in the future (e.g., for initial provisioning, how far in the future certificates will be valid), and an indication of when the tenant will need to request a certificate top-off (e.g., how far into using certificates the end-entity will wait before requesting additional certificates).

The customized workflows and customized configurations can be used to customize LPFs, and the LPFs can be transmitted to the V2X devices to customize the operations and/or configurations of the V2X devices. For example, a customized workflow and/or customized configuration can determine what information should be received and stored and how to provision a security asset (e.g., which registration authority to use, custom information to add to the security asset, custom quantities of security assets to provision on a device, etc.).

In various implementations, LPFs can be installed on computerized devices needing certificates, such as, for example, the V2X devices. This can allow the end entities to customize processes performed by the V2X devices and/or to provide customized interfaces for the V2X devices. For example, an LPF can instruct a V2X device to contact a specific entity's server (e.g., via a custom Uniform Resource Locator (URL)) and/or a specific SCMS. As a further example, an LPF can cause a V2X device to download limited amounts of security assets or define the lifetime of certificates downloaded by the V2X device (e.g., 1 week instead of 3 years).

In some implementations, an LPF can also include customized workflows and/or customized configurations based on a type of device that is provisioned with security assets. For example, using the entity management system, an end entity can specify the number of security assets to provision on various types of devices, the customized configuration can be stored in an LPF for the entity, and when the device requests security assets the LPF can be used to determine the number of security assets to provision.

Additional features that can be performed by an enhanced SCMS include, for example: providing a virtual registration authority that can be contacted by V2X devices; creating custom accounts for each end entity at the SCMS; creating new V2X device types at the SCMS; verifying device types as Department of Transportation (DOT) or other authorizing body approved; acquiring enrollment or other types of public keys (e.g., signature/encryption keys, Advanced Encryption Standard (AES) butterfly key expansion values, etc.); returning public keys, LPFs, and Local Certificate Chain Files (LCCFs) for aftermarket devices, returning registration authority URLs for final programming of fielded devices, tracking devices based on device identifiers, provisioning aftermarket devices, etc. In various implementations, an LCCF can be a binary encoded array of certificates that is created by a registration authority for publication to its end entity.

FIG. 1 is a diagram depicting an example of a method performed in a secure provisioning system, consistent with disclosed implementations. The example method can begin at 100 when a custom account is created for an entity at an entity management system of an enhanced SCMS. Additionally, in some implementations, for the purposes of the example described with regard to FIG. 1, the end entity can be a Tier-1 manufacturer of a V2X device.

In some implementations, the enhanced SCMS can create an account for the end entity based on receiving a request from the end entity. The request to create the account can include, for example, an identifier of the end entity, information about the end entity, a type of the end entity (e.g., a Tier-1 manufacturer), a security asset associated with the end entity, etc.

In 110, the enhanced SCMS can register a device type at a CMP of the enhanced SCMS. For example, a request to register a device type can be received from an end entity via their account or can be received from an administrator of the enhanced SCMS. In some implementations, the request to register the device type can include an identifier of the device type or a security asset associated with the device type. The enhanced SCMS can register the device type by storing the identifier of the device type in, for example, an SMS database.

In 120, the enhanced SCMS can verify whether the device type is approved by an authorizing body (e.g., the DOT). For example, the SCMS can transmit the identifier and/or security asset to a server associated with the authorizing body to request verification and/or can compare the identifier and/or security asset to a list of approved device types stored in the SMS database. The SCMS can then store an indication of whether the device type is verified, e.g., in the SMS database.

In 130, the SCMS can acquire public keys for a device (e.g., enrollment certificate public keys, signature keys, encryption keys, AES butterfly key expansion values, and the like) and acquire or generate an identifier for the device. For example, the public keys can be received from the device or an end entity can access their account via an entity management system and input the public keys and/or input the identifier. The public keys and/or identifier for the device can be stored in the SMS database.

In 140, based on the public keys acquired in 130, the enhanced SCMS can return enrollment certificates to the end entity to be provisioned on the device and/or to the device itself. In some implementations, the enhanced SCMS may also return a registration authority URL and certain configuration data for final programming into the device. For example, the registration authority URL may be unique to the end entity and/or customized by the end entity (via the entity management system). As a further example, the registration authority associated with the URL can be a virtual registration authority associated with an SCMS of the enhanced SCMS.

In various implementations, the enhanced SCMS receives public keys from the computerized device that needs certificates. For example, the enhanced SCMS may receive only an enrollment public key or the enhanced SCMS may receive the enrollment public key and other application/pseudonym public keys. The enhanced SCMS may return only an enrollment certificate (with the other data like LPF) or the enhanced SCMS may return application/pseudonym certificates as well, depending on the supplied public key(s) received from the device. In certain implementations where the computerized device is an aftermarket device, the enhanced SCMS may receive public keys for the aftermarket device, and may return public keys, an LPF, an LCCF, and other data to the aftermarket device. According to certain implementations, the download of an LPF and LCCF for a computerized device are accomplished through Representational State Transfer (REST) service calls and do not include an enrollment certificate (e.g., a signed message). For all other REST service calls, an SCMS host of the enhanced SCMS can perform a lookup to verify that a specific enrollment certificate for a device is owned by or associated with a certain tenant. That is, a cryptographic validation can be made for these service calls to ensure they are allowed. For LPF and LCCF downloads, the tenant identifier (ID) in a URL, route, HTTP header, or other mechanisms is used to determine which file to provide to the computerized device. The LCCF can be consistent for all tenants of the enhanced SCMS (i.e., all certificates included), but the LPF may be different per tenant. For other service calls, a strong cryptographic link ensures that the computerized device and certificate management is securely managed, even though a single registration authority (e.g., a virtual registration authority) or a single set of SCMS backend components is handling different policies.

In 150, the enhanced SCMS can set the state of the device to initially provisioned or to provisioned if the device is an aftermarket device (e.g., in the SMS database) and can track the device for when the device is further provisioned by an OEM or traffic management center at a subsequent stage of the provisioning, as described below with regard to FIG. 2.

Figure 2:
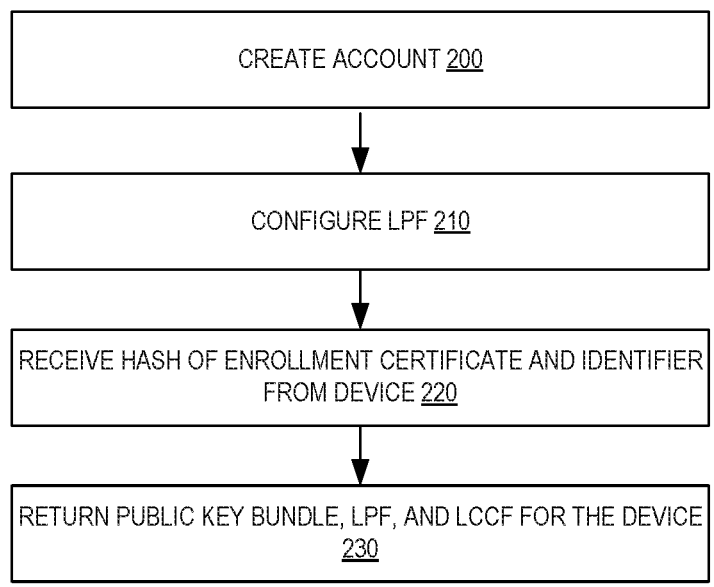
FIG. 2 is a diagram depicting an example of a method for configuring and providing a local policy file (LPF) for a computerized device performed in a secure provisioning system consistent with implementations of the invention.

FIG. 2 is a diagram depicting an example of a method performed in a secure provisioning system, consistent with disclosed implementations. The example method can begin at 200 when a custom account is created for an end entity at the enhanced SCMS. In various implementations, the custom account can be created and/or managed via an entity management system of the enhanced SCMS.

Additionally, in some implementations, for the purposes of the example described with regard to FIG. 2, the entity can be an OEM or a traffic management center that operates a V2X device and/or operates a product that incorporates one or more V2X devices. In other implementations, the entity can be a Tier-1 manufacturer of the V2X device when the Tier-1 manufacturer ships partially or fully provisioned devices to OEMs. The end entity may also be the USDOT or other approval body and used to create and manage a database of approved devices that may be issued certificates.

In some implementations, the enhanced SCMS can create an account for the end entity based on receiving a request from the end entity. The request to create the account can include, for example, an identifier of the end entity, information about the end entity, a type of the end entity (e.g., an OEM or a traffic management center), a security asset associated with the end entity, etc.

In some implementations, creating an account for the end entity can include generating one or more default LPFs for the entity. For example, different default LPFs can be associated with different device types.

In 210, the enhanced SCMS can receive a request to configure an LPF. For example, the request to configure the LPF can be a request to configure a workflow for a particular device type, a request to set a URL of a registration authority, a request to change or set geographic restrictions (e.g., geographic coordinates where an RSU can operate), a request to configure a top-off policy (e.g., change a number of security assets to provision, set the types of authorized security assets, etc.), and the like. In some implementations, a top-off policy can be used to determine how to respond to a top-off request, as described with regard to FIG. 3 below. In further implementations, a top-off policy can be set based on a device type, based on application certificates associated with a device, and/or based on a location of the device.

In 220, the SCMS can receive a hash of an enrollment certificate or the hash of the initial certificate request from a V2X device via the CMP and an identifier of the V2X device. In some implementations, the hash and identifier can be received via the account created for the end entity in 200.

In some implementations, the enrollment certificate can be an enrollment certificate that was returned to the device by the enhanced SCMS in 140, described above. In other implementations, the device can be an aftermarket device, and the enrollment certificate may not have been provided by the enhanced SCMS.

In further implementations, if the device is an RSU, the SCMS can additionally or alternatively receive a hash of an application certificate with the identifier of the V2X device.

In some implementations, the identifier can be an identifier that was received or generated by the enhanced SCMS in 140, described above, and the enhanced SCMS can identify the V2X device and/or a type the V2X device based on the identifier of the V2X device.

In 230, the enhanced SCMS can return a public key bundle, an LPF, and an LCCF to the device. In some implementations, the information returned to the device can be determined based on identifying the device in 220. For example, the LPF that is returned can correspond to an LPF for the device type selected and/or customized by the end entity associated with the V2X device. Based on returning the information to the V2X device, the enhanced SCMS can set a state of the device to provisioned or partially provisioned. In various implementations, a device state of provisioned indicates that the device has its enrollment certificate pseudonym/application certificates, and other files, such as, for example, an LPF and an LCCF. A device state of partially provisioned can be used to indicate that a computerized device only has some of this data. In some implementations, the enhanced SCMS may keep a count of the number of provisioned devices associated with the enhanced SCMS and/or with each end entity and may update the count based on setting the state of the device to provisioned. For example, the enhanced SCMS can use the number of provisioned devices to confirm that the number of provisioned devices does not exceed a predetermined size of a production run. Thus, the enhanced SCMS can verify that there is no unauthorized overproduction.

In 240, the enhanced SCMS can receive a request to manage a deployed device. In some implementations, the request to manage a deployed device can be a request to configure an LPF after the device is deployed. For example, the request to configure the LPF can be a request to change or set geographic restrictions, a request to change a number of security assets to provision, etc. After the LPF is updated, the enhanced SCMS can transmit the updated LPF to the appropriate device when the device next contacts the enhanced SCMS. For example, the device may contact the enhanced SCMS to request a top-off of security assets, as described with regard to FIG. 3.

Figure 3:
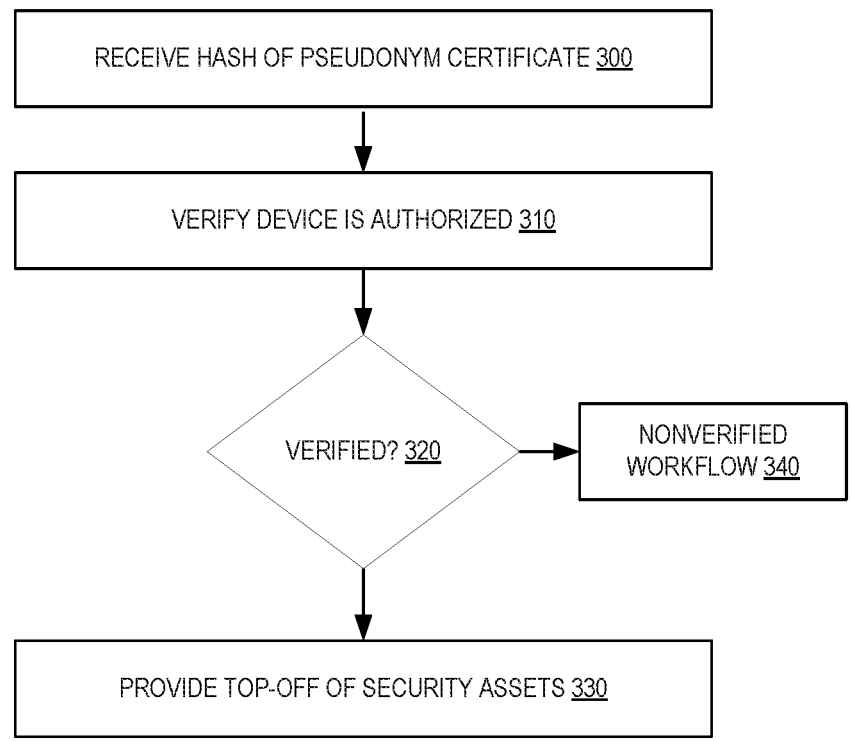
FIG. 3 is a diagram depicting an example of a method for providing a top-off of security assets to a computerized device performed in a secure provisioning system consistent with implementations of the invention.

FIG. 3 is a diagram depicting an example of a method performed in a secure provisioning system, consistent with disclosed implementations. The example method can begin at 300 when a hash of a pseudonym certificate is received at the enhanced SCMS. In various implementations, the hash of the pseudonym certificate can be received from a V2X device that was provisioned via the enhanced SCMS or from an aftermarket V2X device that was not provisioned via the enhanced SCMS.

In some implementations, the hash of the pseudonym certificate can be included as part of a request to top-off security assets at the V2X device.

In further implementations, a Content Delivery Network (see, e.g., the content delivery network 412 of FIG. 4, discussed below) can be associated with the secure provisioning system. The Content Delivery Network can include a distributed network of devices that can store and/or obtain security assets, and can allow V2X devices to top-off security assets from devices that are closer in physical proximity to the V2X devices (e.g., to reduce network latency).

In 310, the enhanced SCMS can verify whether the device is authorized. For example, the enhanced SCMS can access information associated with an account of an end entity associated with the V2X device to determine whether the device is authorized and has an active status. As shown in FIG. 3, 310 can verify that a computerized device is authorized. In 310, if a computerized device is not authorized (e.g., stolen, misbehaving, inactive, etc.) that device will be denied top off. Verification of the device being authorized in 310 ensures the security intent of proper and authorized operation of the computerized device in the ecosystem. The enhanced SCMS will not provide certificates to unauthorized devices. Devices may be unauthorized due to payment failure, compromise, a revoked status, etc.

In various implementations, the end entity may be able to change the status of V2X devices associated with the end entity between active and inactive. For example, if a V2X device is reported as stolen or otherwise compromised, the end entity may change the status of the V2X device from active to inactive.

If, in 320, the V2X device is verified as active, the enhanced SCMS can provide a top-off of security assets in 330. In some implementations, the SCMS can provide a top-off of security assets based on a top-off policy set by the end entity associated with the V2X device. For example, the end-entity may specify the number of security assets to provision on the V2X device and/or specify which type of security assets are authorized to be provisioned on the V2X device, as described above. Additionally, in some implementations, the enhanced SCMS can provide an updated LPF to the V2X device, if appropriate. In further implementations, the enhanced SCMS can instruct the V2X device to retrieve the top-off of security assets via a Content Delivery Network by determining a device that is physically closer to the V2X device, and instructing the V2X device to retrieve the top-off from that closer device.

If, in 320, the V2X device is not verified as active, the enhanced SCMS may not provide a top-off of security assets in 340, but, instead, can follow a custom non-verified workflow set by the end entity associated with the device (e.g., via a CMP). For example, the enhanced SCMS may send a shutdown request to the V2X device, may retrieve global positioning system (GPS) coordinates from the device, may provide an updated LPF to the V2X device, etc.

In some implementations, the features described herein can prevent unauthorized provisioning or incorrect provisioning of V2X devices. For instance, public safety vehicles may have unique capabilities in the V2X ecosystem to control intersection traffic signals. The above-described features can ensure that only public safety vehicles are issued certificates with these capabilities to maintain the overall correct operation of the V2X ecosystem.

In further implementations, the enhanced SCMS may provide re-enrollment functionality. In some instances, a fielded device may need to be reset to a factory "default" provision in which all the originally provisioned keys and data are erased. To re-enroll such a device, the enhanced SCMS can use a multistage process to securely re-provision this device so that re-enrollment of unauthorized devices is prevented. For example, the enhanced SCMS will establish a secure communications path to a known end location such as an OEM's service bay. Mutually authenticated Transport Layer Security could be used to establish such a secure communications path. The enhanced SCMS can then request that the device's microprocessor serial number or other permanent identifier be retrieved from the device along with a new Enrollment Key Certificate Signing Request. The enhanced SCMS can then verify that it has previously provisioned a device with this permanent identifier. If the enhanced SCMS can verify this, then the enhanced SCMS will return an enrollment certificate with other device provisioning information such as the LPF, etc. The enhanced CMS can retain a state record for the device indicating that it has been re-enrolled. The device can then use SCMS protocols to request a pseudonym/application certificate bundle. Based on the configuration settings in the enhanced SCMS, the SCMS will use its flexible provisioning mechanism to download to the device only what it is authorized to receive. This can allow the OEM and/or its service site to be queried to verify that the re-enrollment provisioning is authorized. This additional check may be performed if there is a possibly of rogue activity or if re-enrolling a high value entity (e.g., a police car that has special capabilities to control intersection signal lights).

Although an example V2X system has been used to illustrate these new capabilities, they may also be used with other IoT devices, such as, for example, the European C-ITS Car to Car (C2C) and Car to Infrastructure (C2I, C2X) system, or intelligent medical devices.

Figure 4:
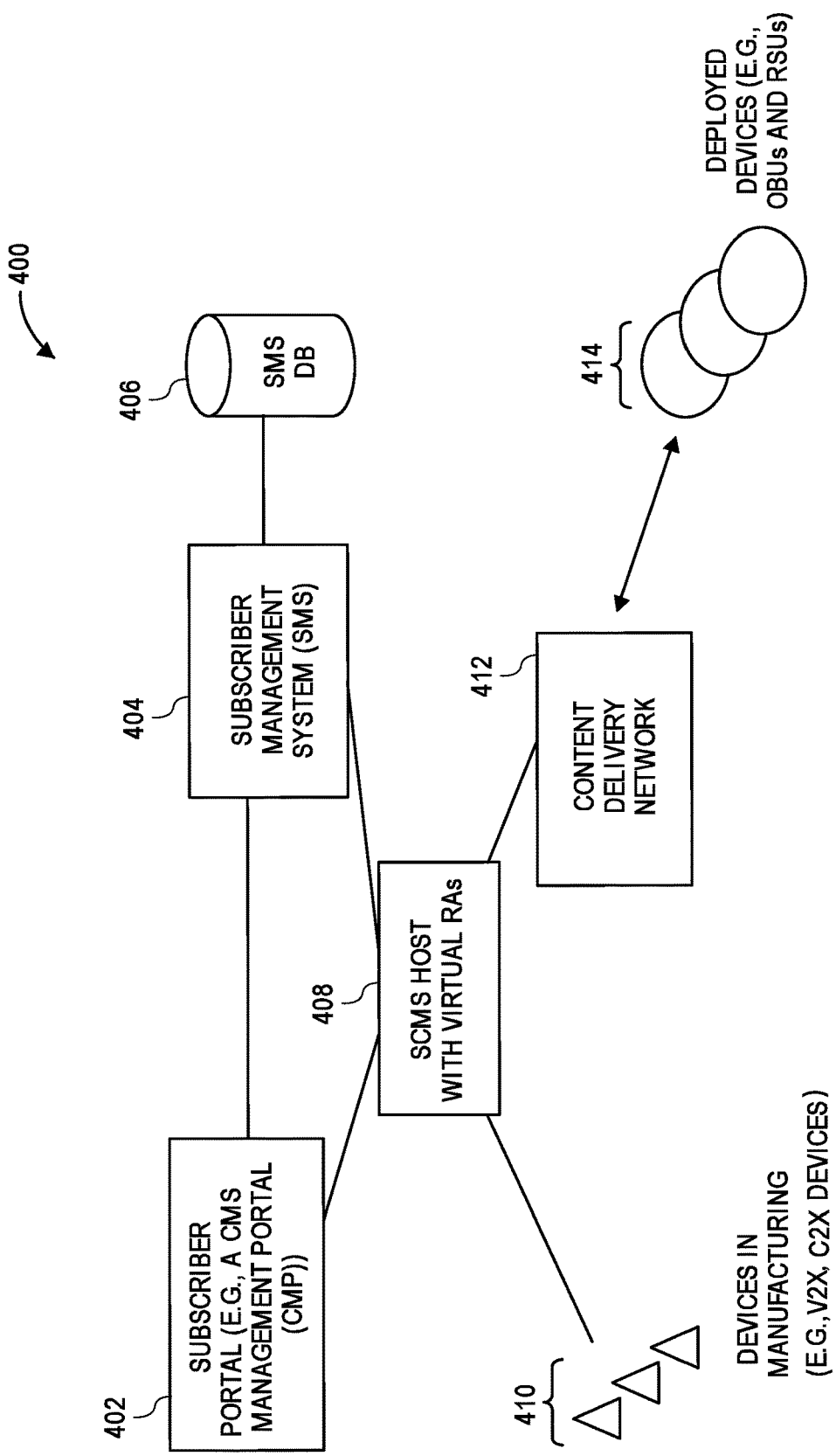
FIG. 4 is a diagram depicting an example of a secure provisioning system configured to support multi-tenant operations consistent with implementations of the invention.

FIG. 4 is a diagram depicting an example of a secure provisioning system 400, consistent with disclosed implementations. The secure provisioning system 400 can include an SCMS host 408 with virtual registration authorities, a CMS management portal (CMP) 402, a subscriber management system (SMS) 404, a SMS database 406, one or more computerized devices 410 in manufacturing, a content delivery network 412, and one or more deployed devices 414. In some implementations, the SMS 404 functions as an entity management system for managing configuration information for subscriber entities. In various implementations, the SMS 404 is operable to manage tenants and information related to the tenants, some of which may be sent to the tenant's OBUs, RSUs, and TMC devices. As shown in FIG. 4, the deployed devices 414 can include computerized devices with OBUs (e.g., vehicles with V2X or C2X devices) and/or one or more RSUs. In the example of FIG. 4, the CMP 402 can function as a subscriber portal. In certain implementations, the CMP 402 receive tenant information from a tenant (e.g., a client), and the CMP 402 then saves parameters from the tenant in an LPF. According to such implementations, a separate LPF is generated for each tenant, and the CMP 402 is used by each tenant to configure their version of the secure provisioning system 400 as they require. For example, a tenant can indicate parameters to be stored in the LPF that configure the duration of validity for certificates (e.g., a certificate validity period), a number of certificates devices of the tenant are allowed to possess, an overlap time period for the tenant's certificates, an amount of time the tenant's certificates will be valid for in the future (e.g., for initial provisioning of the tenant's devices, how far in the future certificates will be valid), and an indication of when the tenant will need to request a certificate top-off (e.g., how far into using certificates the end-entity will wait before requesting additional certificates).

With continued reference to FIG. 4, the components of the secure provisioning system 400 form an enhanced SCMS that can include the SMS 404, the SCMS host 408 with virtual registration authorities, the CMP 402, and the SMS database 406. In some implementations, each of the CMP 402, the SMS 404 (e.g., an entity management system), the SMS database 406, and the SCMS host 408 with the virtual registration authorities can be separate devices, each including one or more processors, one or more computer-readable non-transitory media, and the like. In alternative or additional implementations, two or more of the CMP 402, the SMS 404, the SMS database 406, and the SCMS host 408 with the virtual registration authorities can be combined into a single computing device. As shown in FIG. 4, components of the secure provisioning system 400 communicatively coupled to other components of the secure provisioning system 400.

In various implementations, the SCMS host 408 with virtual registration authorities may provide security assets and validate hashes of security assets as described above. In further implementations, the CMP 402 may provide interfaces for entities (e.g., tenants, subscribers, clients) and computerized devices (e.g., V2X or C2X devices) to communicate with an enhanced SCMS. For example, the CMP 402 can provide communications interfaces that a plurality of tenants and computerized devices of the plurality of tenants can use to exchange communications with the SCMS host 408. Such communications can include, for example, provisioning requests, HTTPS POST requests, request acknowledgements, request results, batch certificate downloads, and other messages. In additional or alternative implementations, SMS 404 functions as an entity management system that can store and/or manage accounts (e.g., account information) of various entities (e.g., tenants, subscribers, clients, customers) that use the enhanced SCMS. In still further implementations, the SMS database 406 may store information for the enhanced SCMS. For example, the SMS database 406 can store information for identifying computerized devices at later stages, and can further associate each computerized device with an end entity (e.g., a tenant) that provisions the computerized device.

As further depicted in FIG. 4, the devices 410 in manufacturing may represent V2X or C2X devices currently associated with a Tier-1 manufacturer (as described above), and deployed vehicles and RSUs can represent devices currently associated with an OEM and/or a traffic management center.

In the example implementation shown in FIG. 4, the content delivery network 412 can be a component of or associated with the secure provisioning system 400. The content delivery network 412 can include a distributed network of devices that can store and/or obtain security assets, and can allow the deployed devices 414 to top-off security assets from devices that are closer in physical proximity to the deployed devices 414 (e.g., to reduce network latency). For example, deployed V2X devices can top-off certificates from nearby devices by communicating via the content delivery network 412.

Figure 5:
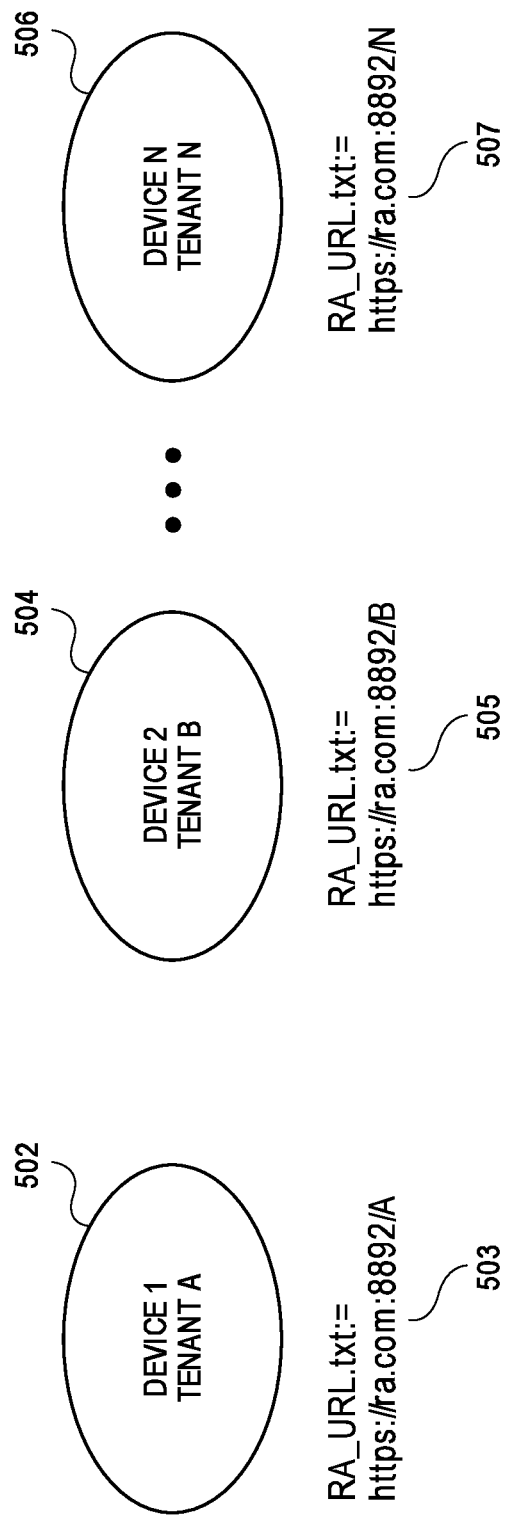
FIG. 5 is a diagram depicting computerized devices corresponding to multiple tenants of a secure provisioning system consistent with implementations of the invention.

FIG. 5 is a diagram depicting computerized devices 502, 504, 506 corresponding to multiple tenants (e.g., tenant A, tenant B, and tenant N) of a secure provisioning system consistent with implementations of the invention. According to various implementations, an enhanced SCMS has the ability to provide multi-tenant operations by, at enrollment time, linking a computerized device to a specific tenant (e.g., client, customer, and subscriber) or deployment.

In the example of FIG. 5, there is a group of n tenants, and the enhanced SCMS can link device 502 to tenant A, can link device 504 to tenant B, and can link device 506 to the last, nth tenant in the group of n tenants (i.e., tenant n). As shown in FIG. 5, such linking of devices 502, 504, 506 to their corresponding tenants can be performed by parsing a respective network address, path, or URL that the devices 502, 504, 506 use to access a registration authority in order to determine the tenant identifier (tenant ID). In the example of FIG. 5, the URL 503 includes a tenant ID of tenant A that is appended to the URL 503, the URL 505 includes a tenant ID of tenant B, and the URL 507 includes a tenant ID of tenant n. These URLs 503, 505, 507 may be used by the computerized devices 502, 504, 506 to access a registration authority of the enhanced SCMS. In alternative or additional implementations, a tenant ID for a tenant can be provided to the devices 502, 504, 506 at enrollment by including a tenant ID that is prepended or otherwise indicated the URLs 503, 505, 507. In other alternative or additional implementations, the tenant ID for a tenant can be provided to a device (e.g., device 502) in a new file at enrollment time where the device adds the tenant ID to a new HTTP header element such as, for example, an 'SCMS tenant' header element. According to various implementations, tenant information such as the tenant ID can be encrypted in a message, thus protecting the identity of a tenant associated with a given device.

Figure 6:
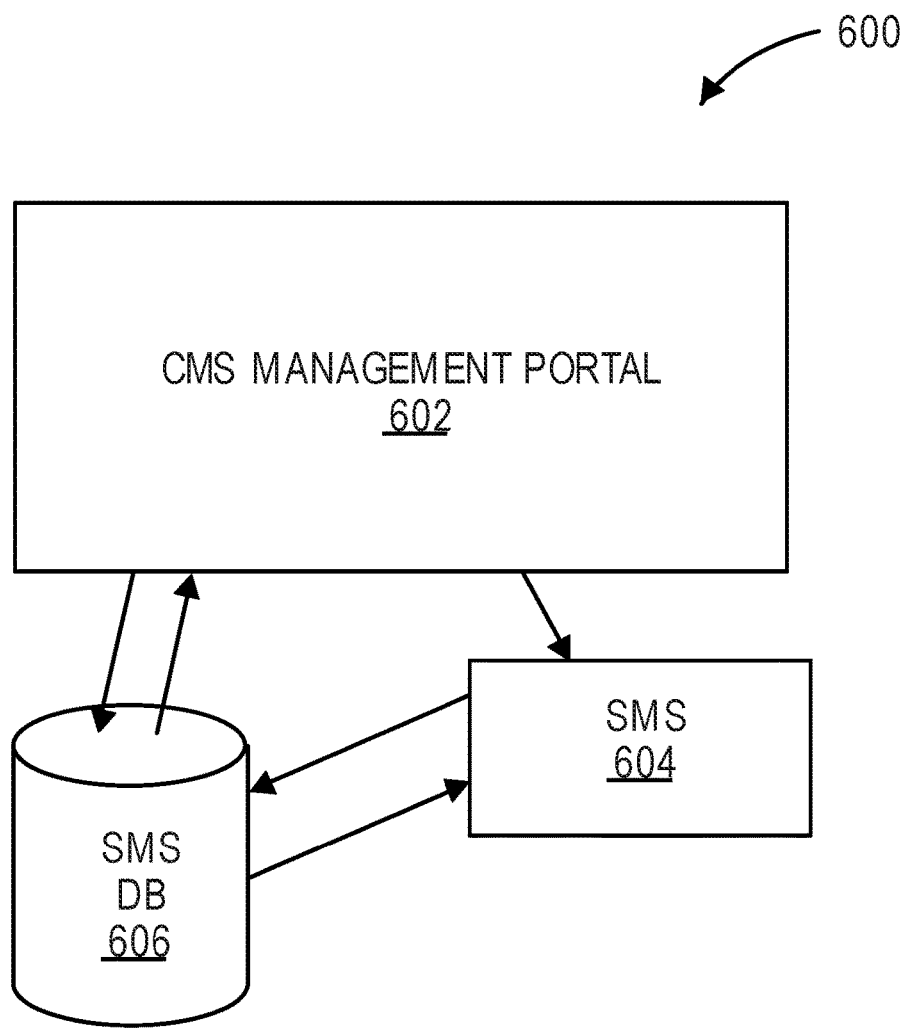
FIG. 6 is a diagram depicting an example workflow within a secure provisioning system including a certificate management system (CMS) management portal (CMP) consistent with implementations of the invention.

FIG. 6 is a diagram depicting an example workflow 600 within a secure provisioning system including a certificate management system (CMS) management portal (CMP) 602, an SMS 604, and an SMS database 606, consistent with implementations of the invention. According to various implementations, a tenant is registered via the CMP 602. Within the CMP 602, a device owner (e.g., an owner of one of the devices 502, 504, 506 discussed above with reference to FIG. 5) establishes an account registers devices, submits certifications for the devices, and is given a tenant ID by the CMP 602.

The example workflow 600 includes registering new customer information (e.g., tenant or subscriber information) with the CMP 602. The workflow 600 also includes identifying a device of the tenant, target uses for the device (e.g., intended uses of the tenant's computerized device), and the tenant providing certification documents. This information is then submitted by the tenant to the CMP 602 for approval. Upon an out-of-band approval by the CMP 602, the tenant then receives a generated tenant ID and account information. The tenant ID and that tenant's account information can be stored in the SMS database 606 and subsequently retrieved from the SMS database 606 by the CMP 602 and the SMS 604 as needed.

In FIG. 6, the CMP 602 can be operable to receive and configure SLA details for a tenant. In some implementations, the CMP 602 can also be operable to configure business requirement details for certain customization required by a tenant. For example, a tenant can indicate to the CMP 602 whether the tenant wants hardware separation for certificate generation (see, e.g., the set of isolated and independent SCMS backend components 724 of FIG. 7, described below), cryptographic separation for cryptographic computations, hardware security module (HSM) separation for sensitive computations, a unique certificate chain under a certificate authority, expected usage per week, local policy parameters (e.g., from an LPF), and other SLA details for the tenant. In the workflow 600, the CMP 602 submits these SLA details to the SMS database 606 for storage and then notifies the SMS 604 for contractual and billing services. In various implementations the SMS 604 is configured to manage tenants and information related to the tenants, some of which may be stored in the SMS database 606 and sent to the tenant's OBUs, RSUs, and TMC devices. Depending on the configuration and service level for a new tenant, backend SCMS services can be created and hardware deployed for the new tenant, depending on the tenant's needs and SLA details. For instance, as shown in FIG. 7, described below, a dedicated registration authority 721 and independent SCMS backend components 724 can be deployed for a tenant N with a higher level of service than other tenants.

Figure 7:
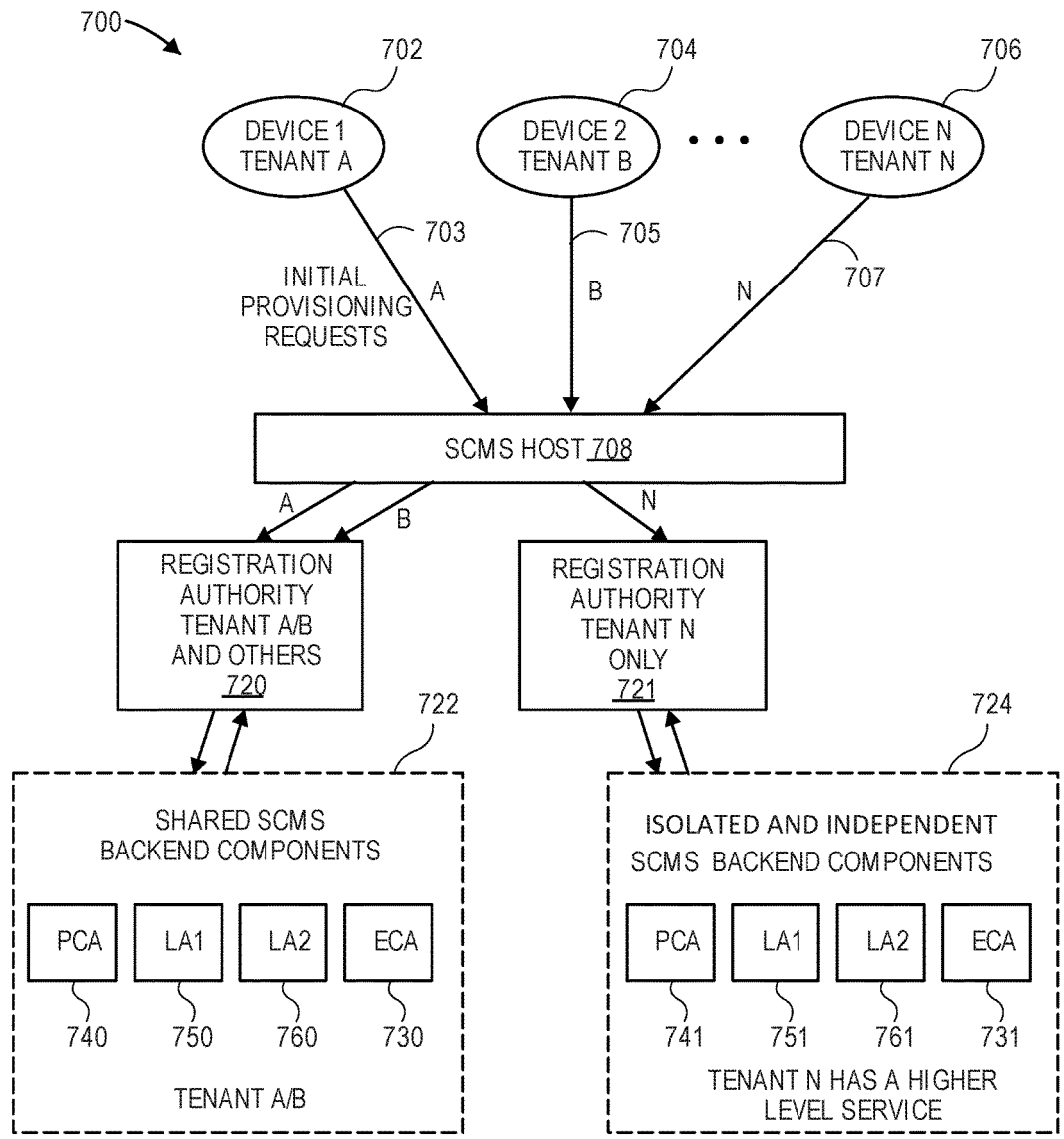
FIG. 7 is a diagram depicting an example operating environment for a secure provisioning system configured to support multi-tenant operations consistent with implementations of the invention.

FIG. 7 is a diagram depicting an example operating environment 700 for a secure provisioning system configured to support multi-tenant operations consistent with implementations of the invention. As shown, the operating environment 700 includes an SCMS host 708, computerized devices 702, 704, 706 associated with multiple tenants of a group of n tenants (e.g., tenants A, B, N), registration authorities 720, 721, and sets of SCMS backend components 722, 724.

In the example operating environment 700 a single SCMS host 708 is a hardware platform with a single IP address, where the SCMS host 708 is shared amongst the tenants of the group of n tenants. That is, the SCMS host 708 handles initial provisioning requests 703, 705, 707 from computerized devices 702, 704, 706. Some tenants, based on required service levels and purchased tiers of service (e.g., as captured in service level agreements (SLAs)), may choose to share SCMS backend components. In the example of FIG. 7, tenants A and B have opted to use the shared set of SCMS backend components 722. Alternatively, other tenants that require higher tiers of service or have greater needs for quickly provisioning larger numbers of certificates, can have SLAs giving the tenants access to separate, dedicated SCMS backend components that include separate hardware components (e.g., isolated and independent hardware components dedicated to performing cryptographic operations for a single tenant). In the example of FIG. 7, tenant N has opted to use the set of isolated and independent SCMS backend components 724. In certain implementations, parameters in respective LPFs for tenants A, B, N can designate use of either the shared set of SCMS backend components 722 or the set of isolated and independent SCMS backend components 724.

As shown in FIG. 7, each of a plurality of computerized devices 702, 704, 706 can submit respective initial provisioning requests 703, 705, 707 to their configured registration authority, via the SCMS host 708, where the provisioning requests 703, 705, 707 indicate a respective tenant ID. According to some implementations, the tenant IDs for tenants A, B, N can be included in route information that is submitted to the SCMS host 708. That is, in the operating environment 700, each of the computerized devices 702, 704, 706 has been enrolled by a specific tenant (e.g., one of tenants A, B, . . . N) and in their respective, initial provisioning requests 703, 705, 707, the tenants provide their respective tenant IDs. In various implementations, the tenant IDs can be provided in a URL (e.g., as in the URLs 503, 505, 507 of FIG. 5), in a route, in an HTTP header element (e.g., an 'SCMS tenant' element), or by some other mechanism.

The SCMS host 708 is the single SCMS registration authority endpoint for a centralized service. The SCMS host 708 receives all requests, including the initial provisioning requests 703, 705, 707, parses out the tenant ID from the request and performs validation (e.g., to determine correct tenant for an enrollment certificate). The SCMS host 708 routes various requests to a virtual, shared registration authority 720, or a dedicated registration authority 721. In various implementations, a tenant ID is added to every message transmitted within the operating environment 700 after the SCMS host 708 parses out the tenant ID from the initial provisioning requests 703, 705, 707. In accordance with some implementations, the tenant ID may be obfuscated in such messages with a hash or by mapping the tenant ID to a universally unique identifier (UUID). This mapping of the tenant IDs to their respective UUIDs can be stored in the SMS database 606 discussed above with reference to FIG. 6. Such obfuscation helps ensure privacy for messages transmitted via the virtual registration authority 720 that is shared between multiple tenants (e.g., tenants A and B). The tenant ID is then used in the operating environment 700 to determine which keys or which certificate chain to use. The tenant ID also allows the registration authorities 720, 721 to determine what policy parameters to abide by for a particular request (e.g., one of the provisioning requests 703, 705, 707).

In the operating environment 700, the SCMS host 708 can be an abstraction or virtual layer above the registration authorities 720, 721. The SCMS host 708 parses tenant IDs from the initial provisioning requests 703, 705, 707. From the perspective of the devices 702, 704, 706 and devices external to the operating environment 700, there is one SCMS URL that all tenants (e.g., clients) use to connect to the SCMS host 708. In this way, and by using the SCMS host 708 to parse tenant IDs from the initial provisioning requests 703, 705, 707, the operating environment 700 ensures that snooping cannot be used to determine whether a particular one of the computerized devices 702, 704, 706 is owned by or associated with a specific tenant. This protects the identity and privacy of tenants from anyone who may attempt to snoop on network traffic passed to the operating environment 700.

In the operating environment 700, the SCMS host 708 can parse a tenant ID from a route, URL, HTTP header, or other mechanism used for the initial provisioning requests 703, 705, 707 and route the initial provisioning requests 703, 705, 707 to the correct registration authority (e.g., shared registration authority 720 or dedicated registration authority 721). As shown in FIG. 7, the SCMS host 708 parses tenant IDs for tenants A and B from initial provisioning requests 703 and 705, and then routes those requests to registration authority 720 based on the parsed tenant IDs. Similarly, the SCMS host 708 parses a tenant ID for tenant N from initial provisioning request 707, and then routes that request to dedicated registration authority 721 based on the parsed tenant ID for tenant N. In alternative or additional implementations, there can be a single registration authority that routes requests with an embedded tenant ID in internal messages exchanged between the SCMS host 708 and the single registration authority. In other alternative or additional implementations, there can be a completely independent, internal virtual registration authority component that fields the initial provisioning requests 703, 705, 707 and then routes the requests to the correct backend components.

In the example of FIG. 7, a set of shared SCMS backend components 722 are components that are shared between tenants A and B. The shared set of SCMS backend components 722 include a shared pseudonym certificate authority 740, a shared linkage authority 1 750, a shared linkage authority 2 760, and a shared enrollment certificate authority 730 that provide certificates and linkage values to tenants A and B. As also shown in FIG. 7, a set of isolated and independent SCMS backend components 724 are components that are dedicated to fulfilling certificate request from a single tenant, tenant N. The set of independent set of SCMS backend components 724 include an independent pseudonym certificate authority 741, an independent linkage authority 1 751, an independent linkage authority 2 761, and an independent enrollment certificate authority 731 that provide certificates and linkage values exclusively to tenant N. In the example of FIG. 7, tenant N has a higher level of service (e.g., a higher service tier or priority of service) than tenants A and B, and as a result, tenant N is serviced by independent set of SCMS backend components 724. In certain implementations, a service tier is associated with each tenant of the group of n tenants, and each tenant's service tier corresponds to one of a plurality of tiers ranging from a lowest service level to a highest service level.

In certain implementations, the dedicated registration authority 721 can also use the shared SCMS backend components 722. That is, implementations can create the dedicated registration authority 721 for tenant N that gives tenant N a unique interface, but the shared SCMS backend components 722 used by tenant N may be shared with other tenants (e.g., tenants A and B). In alternative or additional implementations, the dedicated registration authority 721 can access different sets of shared SCMS backend components 722 depending on product type(s) of computerized devices of a tenant that need certificates. That is, an OBUs of a given tenant may use one set of shared SCMS backend components 722 and RSUs for that tenant could use another set of shared SCMS backend components 722.

According to some implementations, a higher service tier can give tenant N access to the dedicated registration authority 721 that is not shared or used by other tenants. In one such implementation, the dedicated registration authority 721 can be created and configured for tenant N based on that tenant's higher service tier so that the dedicated registration authority 721 gives tenant N a unique interface. In some implementations, tenant N with a higher service tier is given access to isolated and independent backend SCMS components 724 that are not shared with other tenants. In additional or alternative implementations, another tenant with a higher service tier and a dedicated registration authority can access different shared SCMS backend components 722, depending on product type for that tenant's devices that need certificates. That is, an OBU device for a tenant may use one of the shared SCMS backend components 722 and an RSU device could use other shared SCMS backend components 722.

Figure 8A:
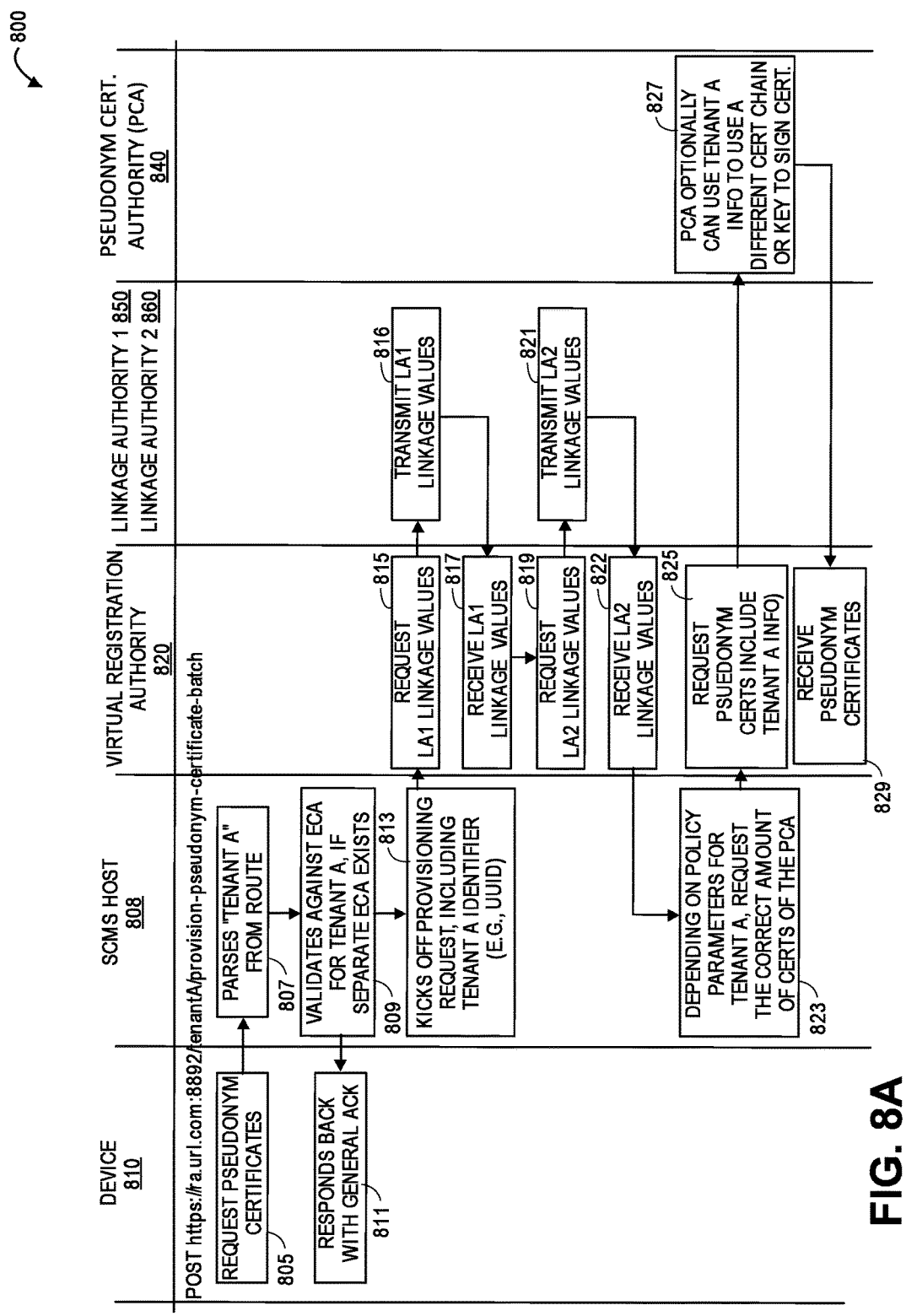
FIG. 8A is the first part of a swim-lane diagram illustrating an example of a process for securely providing credentials such as certificates, to multiple tenants, consistent with implementations of the invention.
Figure 8B:
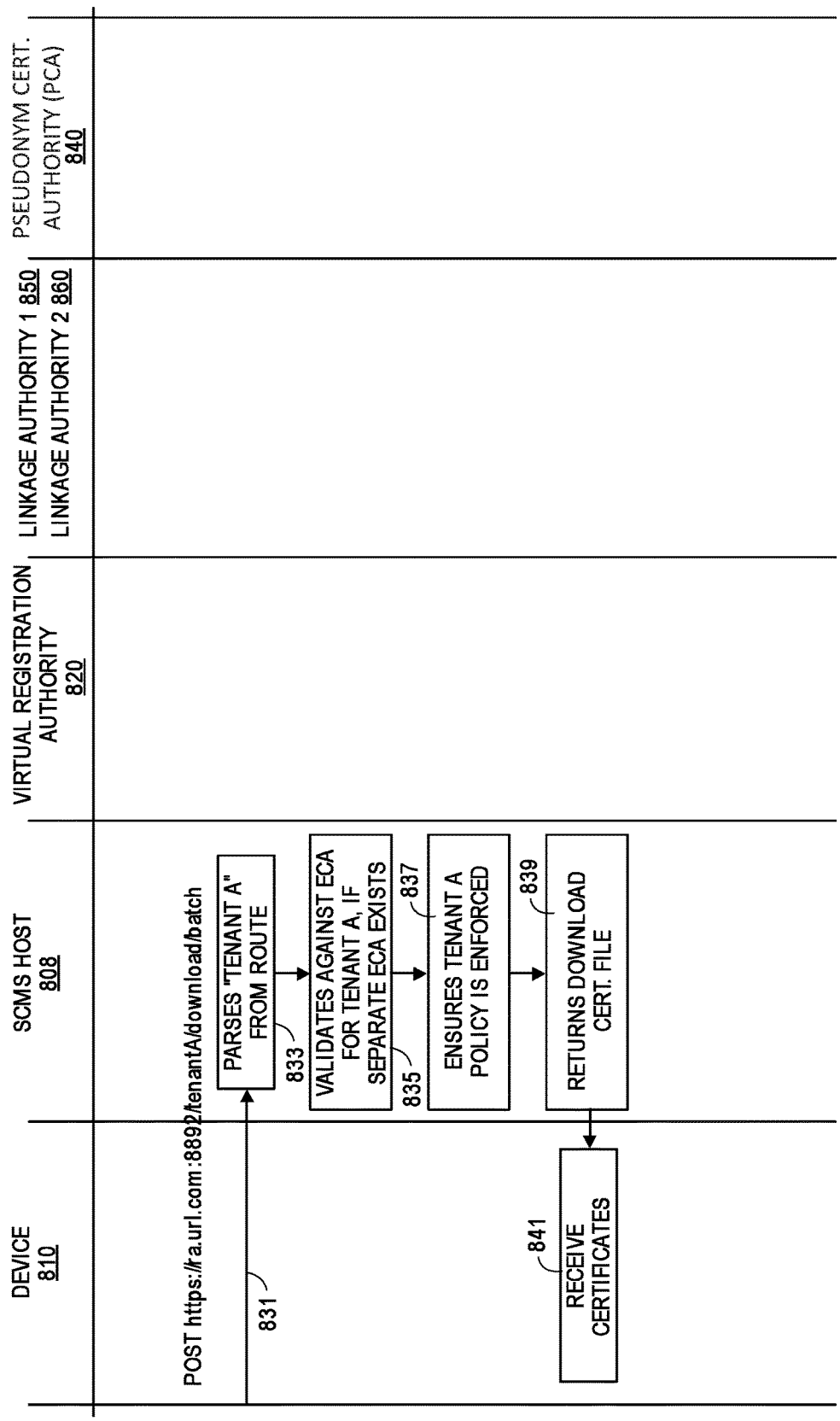
FIG. 8B is the second part of a swim-lane diagram illustrating an example of a process for securely providing credentials such as certificates, to multiple tenants, consistent with implementations of the invention.

FIGS. 8A and 8B are together a swim-lane diagram illustrating an example process 800 for securely providing credentials such as certificates, consistent with implementations of the invention. In the process 800, a virtual registration authority is used to provide certificates to multiple tenants.

In particular, the example process 800 illustrated in FIGS. 8A and 8B includes exchanges of requests and responses between enhanced SCMS components in order to provide certificates to V2X devices, such as device 810. However, implementations described herein are not limited to multi-tenant operations for V2X devices, and the disclosed principles can be applied to other types of computerized devices and computer-controlled devices, such as C2X devices. That is, the enhanced SCMS may function as a V2X or C2X certificate management service. The example process 800 depicted in FIGS. 8A and 8B provides certificates to V2X devices in a multi-tenant environment. That is, FIGS. 8A and 8B depict components of an example enhanced SCMS in the context of the V2X flow of requests and responses.

In various implementations, some or all of the process 800 or the operations shown may be performed by code executing on a computing system (which may include one or more processors or one or more computing subsystems), by a hardware-only system, or by a system that is a hybrid of the two. As shown across the top of FIGS. 8A and 8B, the entities involved with the process 800 include a device 810, an SCMS host 808, a virtual registration authority 820, linkage authorities 850, 860, and a pseudonym certificate authority 840. In various implementations, these entities may communicate with each other to carry out tasks as part of the process 800 for providing certificates, as described below with respect to FIGS. 8A and 8B and throughout this disclosure. In some implementations, the device 810 may be a V2X device located at a manufacturer (not shown).

In certain implementations, the SCMS host 808 may host the virtual registration authority 820. The process 800 can be performed by an enhanced SCMS communicates with devices (e.g., device 810) that submit provisioning requests.

The enhanced SCMS includes the virtual registration authority 820, one or more linkage authorities 850, 860, and the pseudonym certificate authority 840. An example CMS may include one or more application platforms that run an application for the virtual registration authority 820. These application platforms are communicatively connected to one or more compute engines that perform cryptographic computations required by the virtual registration authority 820. The one or more application platforms may include one or more virtual machines (VMs) or one or more hardware platforms (e.g., servers, computers, or other computer hardware capable of hosting and executing a software application). The enhanced SCMS may also include one or more VMs that run an enrollment certificate authority (not shown) and that are communicatively connected to one or more compute engines that perform cryptographic computations required by the enrollment certificate authority. The enrollment certificate authority is operable to generate and conditionally transmit enrollment certificates to the virtual registration authority 820. The example CMS host that hosts the virtual registration authority 820 of FIGS. 8A and 8B may further include one or more VMs that run an application for the pseudonym certificate authority 840 and that are communicatively connected to one or more compute engines that perform cryptographic computations required by the pseudonym certificate authority 840. The pseudonym certificate authority 840 is operable to generate and conditionally transmit pseudonym certificates to the virtual registration authority 820. The enhanced SCMS may also include one or more VMs that run first and second linkage authorities 850, 860 and that are communicatively connected to one or more compute engines that perform cryptographic computations required by the first and second linkage authorities 850, 860. Respective applications for the first linkage authority 850 and the second linkage authority 860 may be operable to generate and conditionally transmit linkage values to the virtual registration authority 820.

The enhanced SCMS that includes the virtual registration authority 820 shown in FIGS. 8A and 8B can also include one or more application platforms that run an application for the virtual registration authority 820 and that are communicatively connected to one or more compute engines that perform cryptographic computations required by the virtual registration authority 820. The enhanced SCMS can additionally include one or more application platforms that run an application for the enrollment certificate authority and that are communicatively connected to one or more compute engines that perform cryptographic computations required by the enrollment certificate authority, which may be operable to generate and conditionally transmit enrollment certificates to the virtual registration authority 820. The enhanced SCMS can further include one or more application platforms that run an application for the pseudonym certificate authority 840 and that are communicatively connected to one or more compute engines that perform cryptographic computations required by the pseudonym certificate authority 840, which may be operable to generate and conditionally transmit pseudonym certificates to the virtual registration authority 820. In addition, the enhanced SCMS can include one or more application platforms that run an application for the first linkage authority 850 and that are communicatively connected to one or more compute engines that perform cryptographic computations required by the first linkage authority 850. Lastly, the enhanced SCMS can also include one or more application platforms that run an application for the second linkage authority 860 and that are communicatively connected to one or more compute engines that perform cryptographic computations required by the second linkage authority 860. The linkage authorities 850, 860 may be operable to generate and conditionally transmit linkage values to the virtual registration authority 820.

In still other implementations, the enrollment certificate authority may be operable to generate enrollment certificates in response to receiving requests for enrollment certificates from the virtual registration authority 820; the pseudonym certificate authority 840 may be operable to generate pseudonym certificates in response to receiving requests for pseudonym certificates from the virtual registration authority 820; and the first linkage authority 850 and the second linkage authority 860 may be operable to generate linkage values in response to receiving requests for linkage values from the virtual registration authority 820. In alternative or additional implementations, the enrollment certificate authority may be operable to generate enrollment certificates in response to receiving requests directly from computerized devices. That is, there are multiple ways to get certificates and the example process 800 shown in FIGS. 8A and 8B is just one example method.

As shown in the example of FIG. 8A, the process 800 begins with operation 805 where the device 810 (e.g., an end entity V2X device) submits an initial provisioning request for pseudonym certificates to the SCMS host 808. As shown, 805 can include the device 810 submitting an HTTPS POST command with a URL that includes a tenant ID for tenant A. In some implementations, the device 810 is provided with a URL at enrollment time, the initial provisioning request in operation 805 comes directly from the device 810, and as shown in FIG. 8A, the provisioning request can be an HTTPS POST command with that URL and port number of the virtual registration authority 820 with the route defined and a tenant identifier (ID) embedded in the URL. This enables the SCMS host 808 to identify the tenant and route the request to the correct virtual registration authority 820 without having to change or reconfigure the device 810 or the process 800.

In some implementations, the provisioning requests can indicate configuration details for the tenant, application permissions needed (e.g., as indicated by Provider Service Identifier (PSID) values), and validity information for certificates. Such information can be passed via a route or in an HTTPS header. For example, a key value pair for an 'SCMS tenant' header element can include a value of 'tenant A.' Privacy of this information can be protected within a Transport Layer Security (TLS) handshake between the device 810 and the SCMS host 808.

In additional or alternative implementations, the provisioning request can be sent with Domain Name System (DNS) where two different URLs or routes resolve to (e.g., point to) the same server or web page. That is, by using DNS, requests from two different tenants that indicate the two tenant's respective tenant IDs can have different routes or URLs, but they will still both resolve to same enhances SCMS and same SCMS host 808. In the V2X environment (e.g., as specified by CAMP) an enrollment certificate is required to contain the application permissions (identified by PSID values) and the geographic region for each RSU and OBU. An RSU or OBU device can only obtain application certificates and/or pseudonym certificates that correspond to the PSID values contained in the enrollment certificate.

At operation 807, after the device 810 sends a provisioning request to the SCMS host 808 with a URL for the virtual registration authority 820, the SCMS host 808 then parses the tenant ID (e.g., a UUID or other unique identifier for tenant A) from the request so that the request can be routed to the virtual registration authority 820 that handles that tenant. In this way, the process 800 can service multiple tenants with a single SCMS host 808, and handle custom configurations. In the example of FIG. 8A, at operation 807, the SCMS host 808 parses the tenant ID for tenant A from the request. In certain implementations, the provisioning request includes metadata indicating the tenant ID for tenant A, where the tenant ID can be a hash, UUID, or other type of unique ID that does not reveal the identity of tenant.

Then, at 809, the SCMS host 808 validates the tenant against an enrollment certificate authority to determine if a separate enrollment certificate authority exists for the tenant. According to certain implementations, downloads of an LPF and LCCF for the device 810 are accomplished through Representational State Transfer (REST) service calls and do not include an enrollment certificate (e.g., a signed message). For all other REST service calls in the process 800, the SCMS host 808 can perform a lookup at operation 809 to verify that a specific enrollment certificate for the device 8 is owned by or associated with a certain tenant (e.g., tenant A in the example of FIG. 8A). Therefore, a cryptographic validation can be made for these service calls to ensure they are allowed. For LPF and LCCF downloads, the tenant ID for tenant A in a URL (as shown in FIG. 8A), route, HTTP header, or other mechanisms can be used to determine which file to provide to the device 810. The downloaded LCCF can be consistent across all tenants (i.e., all certificates included). However, the downloaded LPF may be different per tenant. For other service calls in the process 800, a strong cryptographic link can ensure that the device 810 and certificate management is securely managed, even though a single registration authority (e.g., the virtual registration authority 820) or a single set of SCMS backend components (e.g., the set of shared SCMS backend components 722 discussed above with reference to FIG. 7) is handling different policies.

A primary role of the enrollment certificate authority is to fulfill requests, which can originate from the virtual registration authority 820, to issue enrollment certificates to end-user devices, such as, for example, the device 810. The enrollment certificate authority may interact directly with the SCMS host 808 in order to issue a requested enrollment certificate to device 810. In additional or alternative implementations, the enrollment certificate authority can communicate directly with the device 810 that is operable to act as a proxy between the enhanced SCMS and computerized devices needing enrollment certificates, with the computerized devices needing enrollment certificates, and with servers that act as proxies for clients that request enrollment certificates. For example, the enrollment certificate authority can communicate directly with a device 810 that is located at a manufacturer site (e.g., the manufacturer's factory). An enrollment certificate is a public key certificate that identifies its holder as an authorized participant in an ecosystem in which all participants must share valid enrollment certificates, (such as, for example, the USDOT V2X ecosystem), and in which authorized participants are able to also receive pseudonym certificates that enable communication and operation of a device 810 within the ecosystem (e.g., to enable communications and operations between vehicles and roadside infrastructure in the example of the USDOT's V2X ecosystem).

In various implementations, the validation performed in operation 809 may involve the SCMS host 808 decrypting and verifying the provisioning request, including signature verification, checking for revocation status of the device 810 that is the destination of the certificates (e.g., a computerized device) using a list of unapproved devices (e.g., a blacklist), and determining whether the requestor (e.g., device 810) is allowed to request certificates from the SCMS host 808. For instance, operation 809 may include determining whether a user from a manufacturer is an authorized user (e.g., part of a staff). In some implementations, the SCMS host 808 may also determine at 809 whether a computerized device (e.g., a product) to receive certificates is approved for use. In some instances, a list of approved devices (e.g., a whitelist) may be provided by a regulator and used by a provisioning controller to make this determination.

Next, at 811, the SCMS host 808 responds back to the device 810 with a general acknowledgment (ACK) message confirming the provisioning request has been received.

At 813, after the request for the certificates is verified, the SCMS host 808 initiates a provisioning request that includes the tenant ID for tenant A. In the example of FIG. 8A, the tenant ID is embodied as a UUID.

At operations 815-822, the linkage authorities 850, 860 interact directly with the virtual registration authority 820 in order to fulfill requests for linkage values. At 815, the provisioning request is received at the virtual registration authority 820, and the virtual registration authority 820 transmits a request for a first set of linkage values (LA1) to linkage authority 1 850.

At 816, in response to receiving the request for a first set of linkage values, the linkage authority 1 850 transmits the first set of linkage values to the virtual registration authority 820. The linkage authority 1 850 can transmit the first set of linkage values that have been previously generated (i.e., pre-generated linkage values), or the linkage authority 1 850 can generate and then transmit the first set of linkage values in cases where the values are not pre-generated. At 817, the first set of linkage values are received at the virtual registration authority 820. At 819, the virtual registration authority 820 transmits a request for a second set of linkage values (LA2) to linkage authority 2 860.

Next, as shown in FIG. 8A, at 821, in response to receiving the request for a second set of linkage values, the linkage authority 2 860 transmits the second set of linkage values to the virtual registration authority 820. In various implementations, the linkage authority 2 860 can transmit the second set of pre-generated linkage values, or alternatively, the linkage authority 2 860 can generate and transmit the second set of linkage values. At 822, the second set of linkage values are received at the virtual registration authority 820.

In certain implementations, the linkage authorities 850, 860 shown in FIGS. 8A and 8B can link the identity of the certificate requestor (i.e., a unique identifier of the certificate requestor's device), to an issued pseudonym certificate for revocation purposes. That is, the linkage authority 1 850 and linkage authority 2 860 respectively provide the first and second set linkage values as unique identifiers of the certificate requestor's device to a pseudonym certificate issued by the pseudonym certificate authority 840 as part of process 800. The linkage authority 1 850 and linkage authority 2 860 receive requests for linkage values sent from the virtual registration authority 820 at operations 815 and 819, and then provide the requested linkage values to the virtual registration authority 820 at operations 816 and 821.

With continued reference to FIG. 8A, at 823, the SCMS host 808 examines policy parameters for tenant A, and depending on the policy parameters, generates a request for the correct amount of pseudonym certificates from pseudonym certificate authority 840. In an example, operation 823 may include the SCMS host 808 using the parsed tenant ID from operation 807 to determine what policy parameters to abide by for the particular pseudonym certificate request. For instance, 823 may include retrieving local policy parameters for the device 810 from that device's LPF.

At 825, the virtual registration authority 820 transmits a request for the pseudonym certificates to the pseudonym certificate authority 840. This request may be sent as a batch of pseudonym certificate generation requests that are created by the virtual registration authority 820.

At 827, the request for the pseudonym certificates is received at the pseudonym certificate authority 840. In response to receiving the request at 827, the pseudonym certificate authority 840 optionally uses information for tenant A to use a different certificate chain or key to sign certificates. At 827, the pseudonym certificate authority 840 generates the requested pseudonym certificates and transmits the generated pseudonym certificates back to the virtual registration authority 820. At 829, the pseudonym certificates are received at the virtual registration authority 820.

Next, as shown in FIG. 8B, at 831, the device 810 may send a request to the SCMS host 808 to download a batch of certificates. As shown, the request sent at operation 831 may be an HTTP POST request with a URL that includes a tenant ID for tenant A.

At operation 833, the SCMS host 808 parses the tenant ID from the batch download request. Then, at 835, the SCMS host 808 validates the tenant against the enrollment certificate authority to determine if a separate enrollment certificate authority exists for the tenant.

Next, at 837, the SCMS host 808 ensures that a policy for tenant A is enforced. Operation 837 can include the SCMS host 808 using the parsed tenant ID from operation 833 to determine what policy parameters to abide by for the particular batch pseudonym certificate download request. For instance, 837 may include retrieving local policy parameters for the device 810 from that device's LPF. After ensuring that the policy for tenant A is being enforced with respect to the requested batch of pseudonym certificates, control is passed to operation 839.

At 839, when the pseudonym certificates are ready, the SCMS host 808 transmits the downloaded file with pseudonym certificates to the device 810. At 841, the device 810 receives the pseudonym certificates. At this point, the device 810 is provisioned with the pseudonym certificates and the device 810 can use the pseudonym certificates, and the operations for provisioning the pseudonym certificates are completed.

In additional or alternative implementations, processes similar to the process 800 described above can be used to provide certificates to other computerized devices, such as, for example, C2X devices. For instance, a CMS with components similar to those shown in FIGS. 8A and 8B can provide certificates to one or more On Board Unit (OBUs), Electronic Control Unit (ECUs), Road-Side Units (RSUs), and TMC devices. Such OBUs and ECUs can be configured to be installed into vehicles, watercraft (e.g., boats), aircraft (e.g., airplanes and drones), spacecraft, medical devices, robots, wireless or wired communication modules, and IoT devices. Similarly, the RSUs can be installed into traffic control devices (e.g., traffic signals), roadside content distribution systems, electronic tolling systems, electronic signage devices, and digital display devices (e.g., electronic billboards). A TMCD is operable to be installed in government (e.g., local, state or federal government) traffic management centers for use in digitally signing messages for broadcast or display by RSUs.

Figure 9:
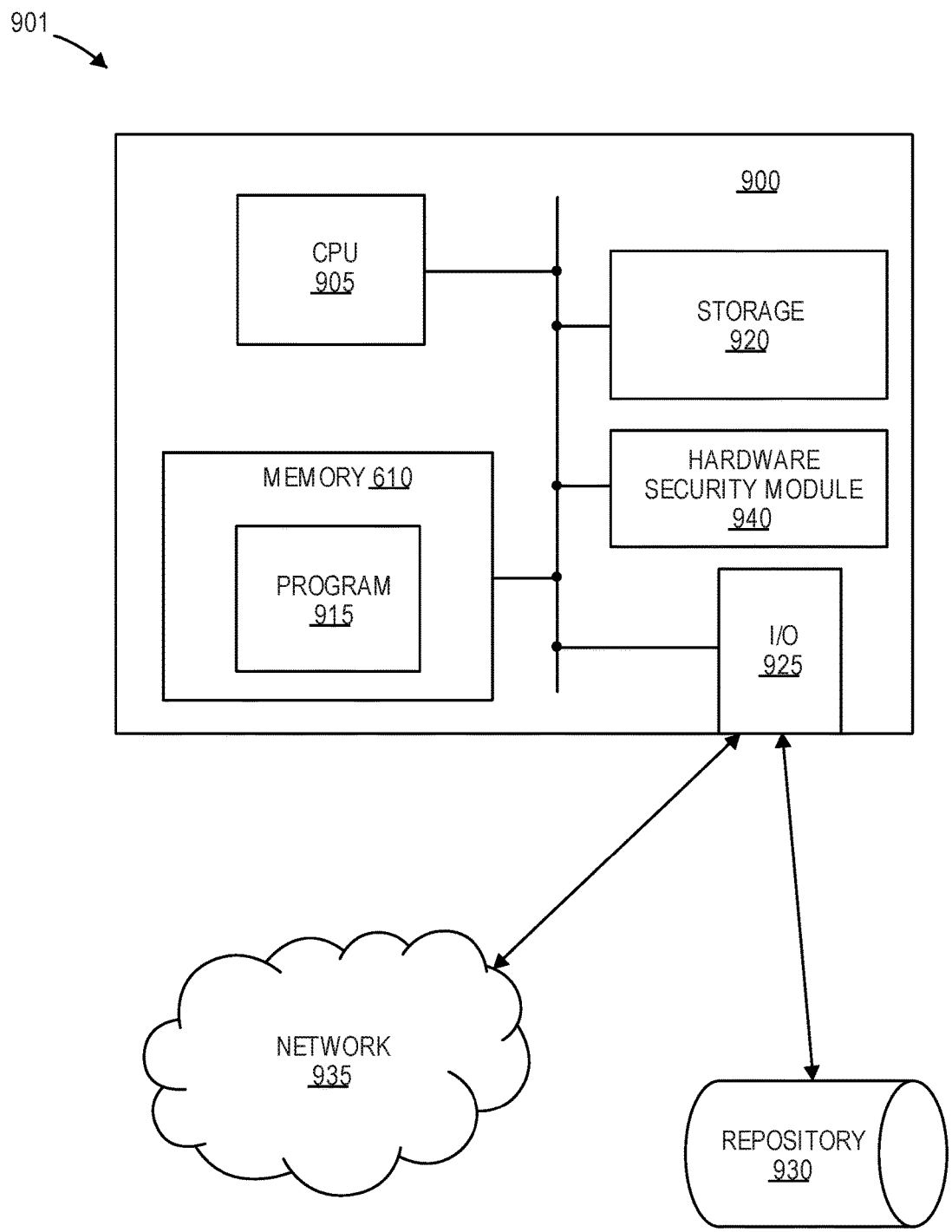
FIG. 9 is a block diagram of an example of a computing system that may be used for hosting systems and methods consistent with implementations of the invention.

FIG. 9 is a block diagram of an example of a computing environment 901, which includes a computing system 900 that may be used for implementing systems and methods consistent with implementations of the invention. Other components and/or arrangements may also be used. In some implementations, computing system 900 may be used to implement, at least partially, various components of FIGS. 1-8, such as the device 810, the virtual registration authority 820, the SCMS host 808, the linkage authorities 850, 860, and the pseudonym certificate authority 840 of FIGS. 8A and 8B, the components of the secure provisioning system 400 of FIG. 4, and the components of the operating environment 700 of FIG. 7. For example, computing system 900 may be used to implement, at least partially, the SCMS host 408 with virtual registration authorities, the CMPs 402, 602, the SMSs 404, 604, and the SMS databases 406, 606 of FIGS. 4 and 6, among other things. Also, for example, computing system 900 may be used to implement, at least partially, the SCMS host 708, registration authorities 720, 721, and the SCMS backend components 722, 724, of FIG. 7, among other things. In some implementations, a series of computing systems similar to computing system 900 may be each customized with specialized hardware and/or programmed as a specialized server to implement one of the components of FIGS. 1-8, which may communicate with each other via a network 935.

In the example shown in FIG. 9, the computing system 900 includes a number of components, such as a CPU 905, a memory 910, an input/output (I/O) device(s) 925, a hardware security module (HSM) 940, and a nonvolatile storage device 920. System 900 can be implemented in various ways. For example, an implementation as an integrated platform (such as a server, workstation, personal computer, laptop, etc.) may comprise a CPU 905, a memory 910, a nonvolatile storage 920, and I/O devices 925. In such a configuration, the components 905, 910, 920, and 925 may connect and communicate through a local data bus and may access a data repository 930 (implemented, for example, as a separate data source or database system) via an external I/O connection. The I/O component(s) 925 may connect to external devices through a direct communication link (e.g., a hardwired or local WiFi connection), through a network, such as a local area network (LAN) or a wide area network (WAN, such as a cellular telephone network or the Internet), and/or through other suitable connections. System 900 may be standalone or it may be a subsystem of a larger system.

The CPU 905 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. CPU 905 could also be an ARM CPU or a proprietary CPU. The memory 910 may be one or more fast storage devices configured to store instructions and information executed or used by the CPU 905 to perform certain functions, methods, and processes related to implementations of the present invention. The storage 920 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 910 contains one or more programs or applications 915 loaded from the storage 920 or from a remote system (not shown) that, when executed by the CPU 905, perform various operations, procedures, processes, or methods consistent with the present invention. Alternatively, the CPU 905 may execute one or more programs located remotely from the computing system 900. For example, the computing system 900 may access one or more remote programs via the network 935 that, when executed, perform functions and processes related to implementations of the present invention.

In certain implementations, the memory 910 may include a program(s) 915 for performing the specialized functions and operations described herein for the SCMS host 408 with virtual registration authorities, the CMPs 402, 602, the SMSs 404, 604, the SCMS host 708, registration authorities 720, 721, the sets of SCMS backend components 722, 724, the device 810, the virtual registration authority 820, the SCMS host 808, the linkage authorities 850, 860, and the pseudonym certificate authority 840 of FIGS. 4, 6, 7, 8A and 8B. In some implementations, the memory 910 may also include other programs or applications that implement other methods and processes that provide ancillary functionality to the invention.

The memory 910 may be also be configured with other programs (not shown) unrelated to the invention and/or an operating system (not shown) that performs several functions well known in the art when executed by the CPU 905. By way of example, the operating system may be Microsoft Windows™, Unix™ Linux™ an Apple Computers™ operating system, or other operating system, including real time operating systems. The choice of operating system, and even to the use of an operating system, is not critical to the invention.

The HSM 940 may be a device with its own processor that securely generates and stores digital security assets and/or securely performs a variety of cryptographic and sensitive computations. The HSM 940 protects digital security assets, such as cryptographic keys, and other sensitive data from possible access by an attacker. In some implementations, the HSM may be a plug-in card or board that attaches directly to the computing system 900.

The I/O device(s) 925 may comprise one or more input/output devices that allow data to be received and/or transmitted by the computing system 900. For example, the I/O device 925 may include one or more input devices, such as a keyboard, touch screen, mouse, and the like, that enable data to be input from a user. Further, the I/O device 925 may include one or more output devices, such as a display screen, a CRT monitor, an LCD monitor, a plasma display, a printer, speaker devices, and the like, that enable data to be output or presented to a user. The I/O device 925 may also include one or more digital and/or analog communication input/output devices that allow the computing system 900 to communicate, for example, digitally, with other machines and devices. Other configurations and/or numbers of input and/or output devices may be incorporated in the I/O device 925.

In the implementation shown, the computing system 900 is connected to a network 935 (such as the Internet, a private network, a virtual private network, a cellular network or other network or combination of these), which may in turn be connected to various systems and computing machines, such as servers, personal computers, laptop computers, client devices, etc. In general, the computing system 900 may input data from external machines and devices and output data to external machines and devices via the network 935.

In the exemplary implementation shown in FIG. 9, the repository 930 is a standalone data source external to system 900, such as a database. In other implementations, the repository 930 may be hosted by the computing system 900. In various implementations, the repository 930 may manage and store data used to implement systems and methods consistent with the invention. For example, the repository 930 may be used to implement the SMS databases 406, 606, of FIGS. 4 and 6 and the LPFs and LCCFs described herein. In some implementations, the repository 930 may manage and store data structures that contain the status and log information for each computerized device that has certificates provisioned by the secure provisioning system 400 of FIG. 4, and the like.

The repository 930 may comprise one or more databases that store information and are accessed and/or managed through the computing system 900. By way of example, the repository 930 may be an Oracle™ database, a Sybase™ database, other relational databases, or non-relational databases. Systems and methods consistent with the invention, however, are not limited to separate data structures or databases, or even to the use of a database or data structure.

One of ordinary skill will recognize that the components and implementation details of the system in FIG. 9 are examples presented for conciseness and clarity of explanation. Other components and implementation details may be used.

Although the foregoing examples use specific examples of computerized devices, such a OBUs, ECUs, and RSUs, for clarity of explanation, the invention is not limited to those specific examples. Various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

The various operations of the applications described herein may be performed, at least partially, by one or more VMs. In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example implementations, the processors or processor-implemented modules may be located in a single geographic location (e.g., within an office environment, a manufacturing environment, or a server farm). In other example implementations, the processors or processor-implemented modules may be distributed across a number of geographic locations.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for securely provisioning a plurality of computerized devices of a plurality of tenants, the system comprising:
   a Security Credential Management System (SCMS) host that is communicatively connected to the plurality of computerized devices and that is operable to receive provisioning requests from respective ones of the plurality of computerized devices needing certificates, each provisioning request indicating a tenant identifier (ID) uniquely identifying a tenant of the plurality of tenants;
   at least one virtual registration authority that is communicatively connected to the SCMS host and is operable to transmit the provisioning requests to a set of SCMS backend components based on the tenant identifier of each provisioning request, the set of SCMS backend components including:
      a shared enrollment certificate authority operable to generate enrollment certificates in response to receiving the provisioning requests for the enrollment certificates from computerized devices sharing a local policy, the provisioning requests to be received via the at least one virtual registration authority;
      an independent enrollment certificate authority operable to generate the enrollment certificates in response to receiving the provisioning requests for the enrollment certificates from computerized devices that do not share a local policy;
      a first linkage authority and a second linkage authority operable to generate linkage values in response to receiving the provisioning requests for linkage values from the at least one virtual registration authority; and
      a pseudonym certificate authority operable to generate pseudonym certificates in response to receiving the provisioning requests for pseudonym certificates from the at least one virtual registration authority.

2. The system of claim 1, further comprising:
   a plurality of virtual registration authorities, the plurality of virtual registration authorities comprising:
      at least one shared virtual registration authority that is operable to process requests for two or more tenants of the plurality of tenants; and
      at least one dedicated virtual registration authority that is operable to process requests for a single tenant, wherein the single tenant has either a business requirement for certain customization or a service level agreement (SLA) indicating that the SCMS host is to provide a higher service tier to the single tenant than a service tier provided to the two or more tenants.

3. The system of claim 2, further comprising:
   a plurality of sets of SCMS backend components, the plurality of sets of SCMS backend components comprising:
      at least one shared set of SCMS backend components, the shared set of SCMS backend components including:
         the shared enrollment certificate authority operable to generate enrollment certificates for two or more tenants of the plurality of tenants in response to receiving requests to generate enrollment certificates from the at least one shared virtual registration authority;

a shared first linkage authority and a shared second linkage authority operable to generate linkage values for two or more tenants of the plurality of tenants in response to receiving requests for linkage values from the at least one shared virtual registration authority; and a shared pseudonym certificate authority operable to generate pseudonym certificates for two or more tenants of the plurality of tenants in response to receiving requests for pseudonym certificates from the at least one shared virtual registration authority; and at least one independent set of SCMS backend components, the independent set of SCMS backend components including:

an independent enrollment certificate authority operable to generate enrollment certificates for the single tenant in response to receiving requests for generate enrollment certificates from the at least one dedicated virtual registration authority;

an independent first linkage authority and an independent second linkage authority operable to generate linkage values for the single tenant in response to receiving requests for linkage values from the at least one dedicated virtual registration authority; and an independent pseudonym certificate authority operable to generate pseudonym certificates for the single tenant in response to receiving requests for pseudonym certificates from the at least one dedicated virtual registration authority.

4. The system of claim 2, wherein a service tier is associated with each tenant of the plurality of tenants, and wherein the service tier corresponds to one of a plurality of tiers ranging from a lowest service level to a highest service level.

5. The system of claim 4, wherein the SCMS host is further operable to:
parse the tenant ID from each provisioning request; and
route, based on the tenant ID and the service tier associated with the tenant, each provisioning request to one of the at least one shared virtual registration authority and the at least one dedicated virtual registration authority.

6. The system of claim 1, wherein each provisioning request indicates the tenant ID in one of a Uniform Resource Locator (URL), a route, a key value pair, or an HTTP header element.

7. The system of claim 1, wherein each provisioning request further indicates configuration details for the tenant, application permissions needed by the tenant, and validity information for certificates needed by a computerized device of the tenant.

8. The system of claim 7, wherein the application permissions needed by the tenant are centrally configured and managed by the SCMS host, and wherein the application permissions needed by the tenant are inserted in the issued certificates based on the tenant ID or a device identifier identifying a computerized device of the tenant.

9. The system of claim 7, wherein the application permissions are indicated by Provider Service Identifier (PSID) values.

10. The system of claim 1, wherein each provisioning request is an HTTPS POST command with a URL of the at least one virtual registration authority.

11. The system of claim 1, further comprising:
a certificate management system (CMS) management portal (CMP) operable to provide interfaces for the plurality of computerized devices and the plurality of tenants to communicate with the SCMS.

12. The system of claim 1, further comprising:
a subscriber management system (SMS) operable to store and manage account information of the plurality of tenants.

13. The system of claim 12, further comprising:
an SMS database that is operably connected to the SMS and that is operable to store the account information and local policy parameters for the tenant.

14. The system of claim 13, wherein the local policy parameters are stored in a local policy file (LPF) for the tenant.

15. The system of claim 14, wherein the LPF for the tenant includes parameters that configure: a duration of validity for certificates, a number of certificates computerized devices of the tenant are allowed to possess, an overlap time period for certificates, an amount of time the certificates will be valid for in the future, and an indication of when the tenant will need to request a certificate top-off.

16. The system of claim 1, wherein the respective ones of the plurality of computerized devices needing certificates correspond to one or more of an On Board Unit (OBU), an Electronic Control Unit (ECU), a Road-Side Unit (RSU), and a Traffic Management Center device (TMCD).

17. The system of claim 16, wherein:
an OBU is operable to be installed in one or more of a vehicle, a watercraft, an aircraft, a spacecraft, a medical device, a robot, a drone, a wireless communication module, a wired communication module, and an Internet of Things (IoT) device;
an ECU is operable to be installed in one or more of a vehicle, a boat, an aircraft, a spacecraft, a medical device, a robot, a drone, a wireless communication module, a wired communication module, and an IoT device;
an RSU is operable to be installed in one or more of a traffic control device, a wireless communication module, a digital billboard, and as an electronic sign; and
a TMCD is operable to be installed in local, state or federal traffic management centers for use in digitally signing messages for broadcast or display by an RSU.

18. A computer implemented method for securely provisioning a plurality of computerized devices of a plurality of tenants, the method comprising:
receiving, by a Security Credential Management System (SCMS) host that is communicatively connected to the plurality of computerized devices, provisioning requests from the plurality of computerized devices needing certificates, each provisioning request indicating a tenant identifier (ID) uniquely identifying a tenant of the plurality of tenants;
parsing, by the SCMS host, the tenant ID from the provisioning requests; and
routing, by the SCMS host, based at least in part on the tenant ID, the provisioning requests to at least one virtual registration authority that is communicatively connected to the SCMS host and is operable to transmit the provisioning requests to a set of SCMS backend components, the set of SCMS backend components including:
a shared enrollment certificate authority operable to generate enrollment certificates in response to receiving the provisioning requests for the enrollment certificates from computerized devices sharing a local policy, the provisioning requests to be received via the at least one virtual registration authority;
an independent enrollment certificate authority operable to generate the enrollment certificates in response to receiving the provisioning requests for the enrollment certificates from computerized devices that do not share a local policy;
a first linkage authority and a second linkage authority operable to generate linkage values in response to receiving the provisioning requests for linkage values from the at least one virtual registration authority; and
a pseudonym certificate authority operable to generate pseudonym certificates in response to receiving the provisioning requests for pseudonym certificates from the at least one virtual registration authority.

19. The computer implemented method of claim 18, further comprising:
sending, from the SCMS host, in response to receiving requested certificates from the set of SCMS backend components, the requested certificates to the computerized devices.

20. The computer implemented method of claim 18, wherein each of the provisioning requests indicates:
the tenant ID in one of a Uniform Resource Locator (URL), a route, a key value pair, or an HTTP header element; and
configuration details for the tenant, application permissions needed by the tenant, and validity information for certificates needed by a computerized device of the tenant.

21. The computer implemented method of claim 20, wherein the application permissions are indicated by Provider Service Identifier (PSID) values in the provisioning requests.

22. The computer implemented method of claim 21, wherein the PSID values are managed centrally by the SCMS host and inserted into certificates generated in response to the provisioning requests.

23. The computer implemented method of claim 18, further comprising receiving, by the SCMS host, additional information including installation verification test data indicating proper installation of an On Board Unit (OBU) in a vehicle or an approved computerized device, wherein the SCMS host requires additional information prior to generating certificates in response to the provisioning requests.

24. The computer implemented method of claim 18, wherein the provisioning requests include an HTTPS POST command with a URL of the at least one virtual registration authority.

25. A system for securely provisioning a plurality of computerized devices of a plurality of tenants, the system comprising:
a Security Credential Management System (SCMS) host that is communicatively connected to the plurality of computerized devices and that is operable to receive provisioning requests from respective ones of the plurality of computerized devices needing certificates, each provisioning request indicating a tenant identifier (ID) uniquely identifying a tenant of the plurality of tenants;
at least one virtual registration authority that is communicatively connected to the SCMS host and is operable to transmit the provisioning requests to a set of SCMS backend components based on the tenant identifier of each provisioning request, the set of SCMS backend components including:
a shared enrollment certificate authority operable to generate enrollment certificates in response to receiving the provisioning requests for the enrollment certificates from computerized devices sharing a local policy file, the provisioning requests to be received via the at least one virtual registration authority, the local policy file to indicate an overlap time period for the enrollment certificates;
an independent enrollment certificate authority operable to generate the enrollment certificates in response to receiving the provisioning requests for the enrollment certificates from computerized devices that do not share a local policy file;
a first linkage authority and a second linkage authority operable to generate linkage values in response to receiving the provisioning requests for linkage values from the at least one virtual registration authority; and
a pseudonym certificate authority operable to generate pseudonym certificates in response to receiving the provisioning requests for pseudonym certificates from the at least one virtual registration authority.

* * * * *